United States Patent
Nishida et al.

(10) Patent No.: US 10,343,696 B2
(45) Date of Patent: Jul. 9, 2019

(54) TRAVEL CONTROL DEVICE OF VEHICLE

(71) Applicants: TOYOTA JIDOSHA KABUSHIKI KAISHA, Toyota-shi, Aichi (JP); DENSO CORPORATION, Kariya-shi, Aichi (JP)

(72) Inventors: Takashi Nishida, Toyota (JP); Takeshi Nanami, Toyota (JP); Youhei Masui, Kariya (JP); Mitsuhiro Tokimasa, Kariya (JP); Toyoharu Katsukura, Kariya (JP)

(73) Assignees: TOYOTA JIDOSHA KABUSHIKI KAISHA, Toyota (JP); DENSO CORPORATION, Kariya (JP)

(*) Notice: Subject to any disclaimer, the term of this patent is extended or adjusted under 35 U.S.C. 154(b) by 4 days.

(21) Appl. No.: 15/541,449

(22) PCT Filed: Apr. 27, 2016

(86) PCT No.: PCT/JP2016/063184
§ 371 (c)(1),
(2) Date: Jul. 3, 2017

(87) PCT Pub. No.: WO2016/181839
PCT Pub. Date: Nov. 17, 2016

(65) Prior Publication Data
US 2018/0050705 A1   Feb. 22, 2018

(30) Foreign Application Priority Data
May 12, 2015   (JP) .................................. 2015-097413

(51) Int. Cl.
*B60W 30/08*   (2012.01)
*B60W 50/04*   (2006.01)
(Continued)

(52) U.S. Cl.
CPC .......... *B60W 50/029* (2013.01); *B60W 30/08* (2013.01); *B60W 50/0205* (2013.01);
(Continued)

(58) Field of Classification Search
CPC .......... B60W 50/029; B60W 50/0205; B60W 50/04; B60W 30/08; G01S 7/4026; G01S 13/867; G08G 1/165; G08G 1/166
See application file for complete search history.

(56) References Cited

U.S. PATENT DOCUMENTS

| | | | |
|---|---|---|---|
| 6,539,294 B1 * | 3/2003 | Kageyama | E02F 3/842 180/168 |
| 6,603,421 B1 * | 8/2003 | Schiff | G01S 13/86 342/13 |

(Continued)

FOREIGN PATENT DOCUMENTS

| | | |
|---|---|---|
| JP | 2004-345518 A | 12/2004 |
| JP | 2005-271721 A | 10/2005 |

(Continued)

*Primary Examiner* — Behrang Badii
*Assistant Examiner* — Daniel L Greene
(74) *Attorney, Agent, or Firm* — Oliff PLC

(57) ABSTRACT

Travel control of vehicle is performed in a state where the axis deviation of radar device has occurred, is avoided. A travel control restriction-use ECU is for restricting or prohibiting execution of travel control of vehicle based on detection result obtained by radar device, travel control restriction-use ECU includes a determining unit configured to determine whether an axis deviation has occurred in the radar device based on detection result obtained by radar device, when detection device, which is configured to detect switch on operation and switch off operation with respect to activation switch of vehicle, detects switch on operation with respect to activation switch of vehicle; and restricting unit configured to restrict or prohibit execution of travel control, during period from when switch on operation is performed with respect to activation switch of vehicle to when determination of whether axis deviation has occurred is completed.

5 Claims, 16 Drawing Sheets

(51) Int. Cl.
*G08G 1/16* (2006.01)
*B60W 50/029* (2012.01)
*G01S 7/40* (2006.01)
*B60W 50/02* (2012.01)
*G01S 13/86* (2006.01)
*G01S 13/93* (2006.01)

(52) U.S. Cl.
CPC ........... *B60W 50/04* (2013.01); *G01S 7/4026* (2013.01); *G01S 13/867* (2013.01); *G08G 1/165* (2013.01); *G08G 1/166* (2013.01); *B60W 2050/0215* (2013.01); *B60W 2050/0295* (2013.01); *B60W 2420/52* (2013.01); *G01S 13/931* (2013.01); *G01S 2007/403* (2013.01); *G01S 2007/4034* (2013.01); *G01S 2007/4091* (2013.01); *G01S 2013/935* (2013.01); *G01S 2013/9321* (2013.01); *G01S 2013/9346* (2013.01); *G01S 2013/9353* (2013.01)

(56) References Cited

U.S. PATENT DOCUMENTS

| | | | |
|---|---|---|---|
| 2002/0138223 A1* | 9/2002 | Schneider | G01S 7/4017 702/104 |
| 2004/0186650 A1* | 9/2004 | Tange | B60T 8/17557 701/96 |
| 2004/0236491 A1* | 11/2004 | Seto | B60T 7/22 701/96 |
| 2005/0216167 A1 | 9/2005 | Nozawa et al. | |
| 2007/0107620 A1* | 5/2007 | Wagner | A63H 19/30 104/53 |
| 2007/0255478 A1* | 11/2007 | Wakashiro | B60K 6/442 701/93 |
| 2010/0023232 A1* | 1/2010 | Isaji | B60W 30/146 701/70 |
| 2012/0130595 A1* | 5/2012 | Hayakawa | B60W 30/12 701/42 |
| 2013/0131925 A1* | 5/2013 | Isaji | B62D 6/00 701/41 |
| 2014/0090505 A1* | 4/2014 | Okuyama | G06F 3/0219 74/485 |
| 2014/0233023 A1* | 8/2014 | Soininen | G01S 17/936 356/138 |
| 2016/0266241 A1* | 9/2016 | Yukumatsu | G01S 7/40 |

FOREIGN PATENT DOCUMENTS

| | | |
|---|---|---|
| JP | 2006-047140 A | 2/2006 |
| JP | 2007-290708 A | 11/2007 |
| JP | 2008-074399 A | 4/2008 |
| JP | 2010-127743 A | 6/2010 |
| JP | 2010127743 A * | 6/2010 |
| JP | 2011-002346 A | 1/2011 |

* cited by examiner

FIG.7
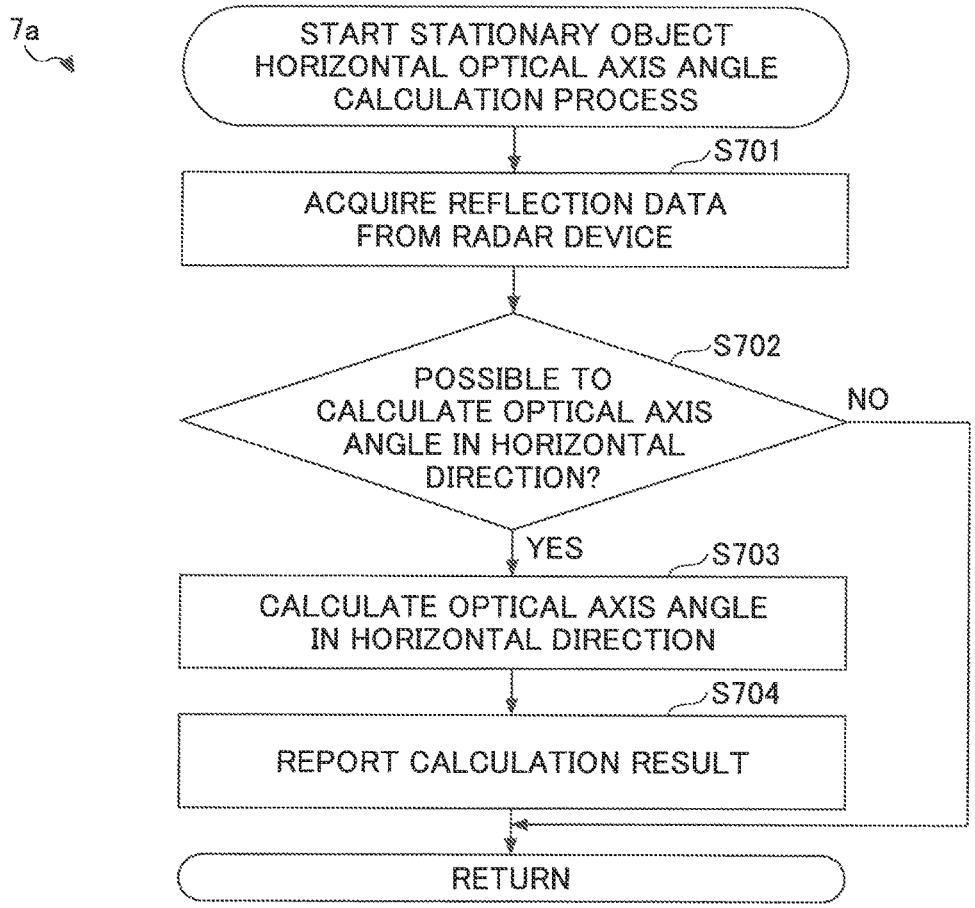
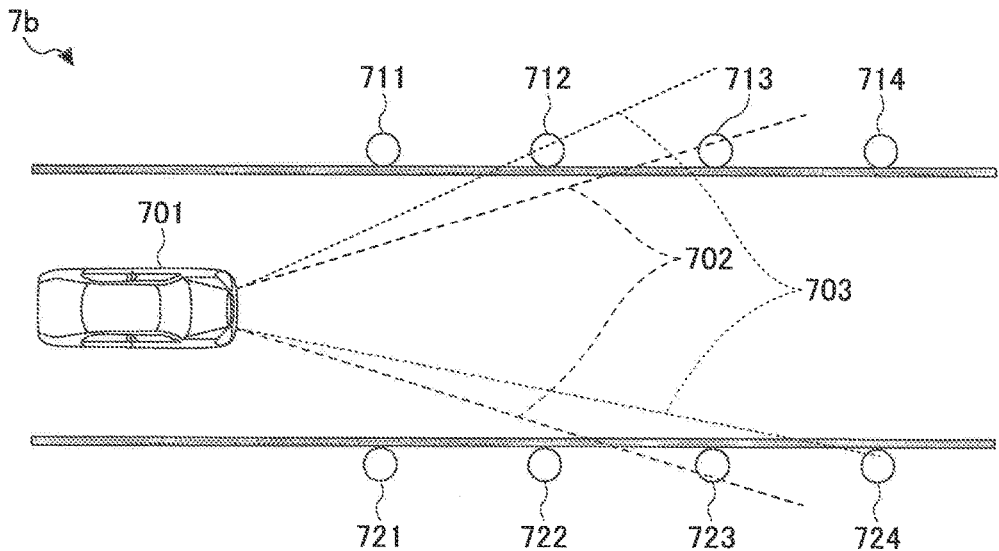

FIG.8
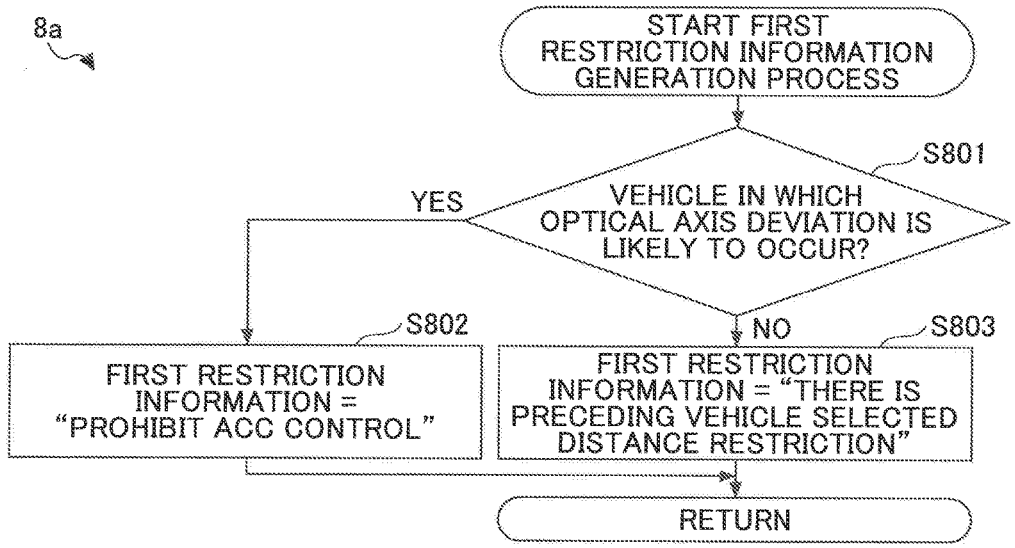
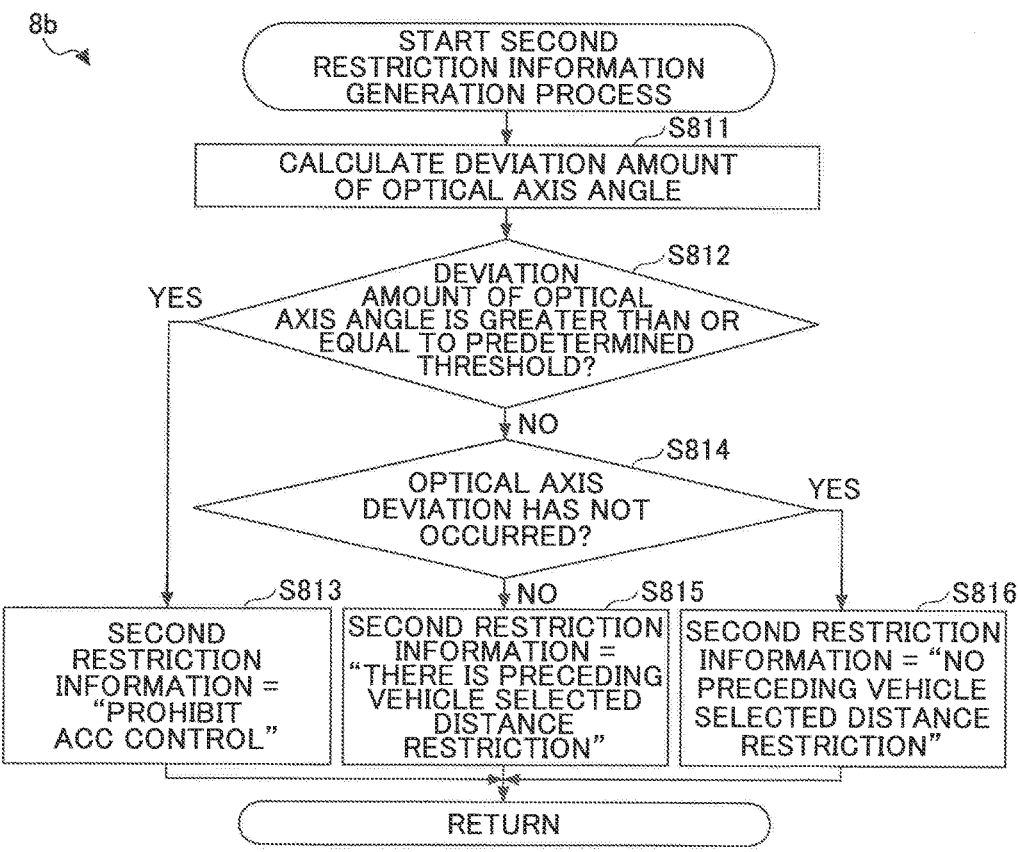

FIG.9
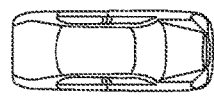
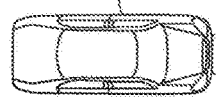
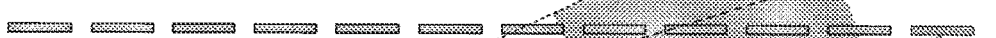

FIG.12
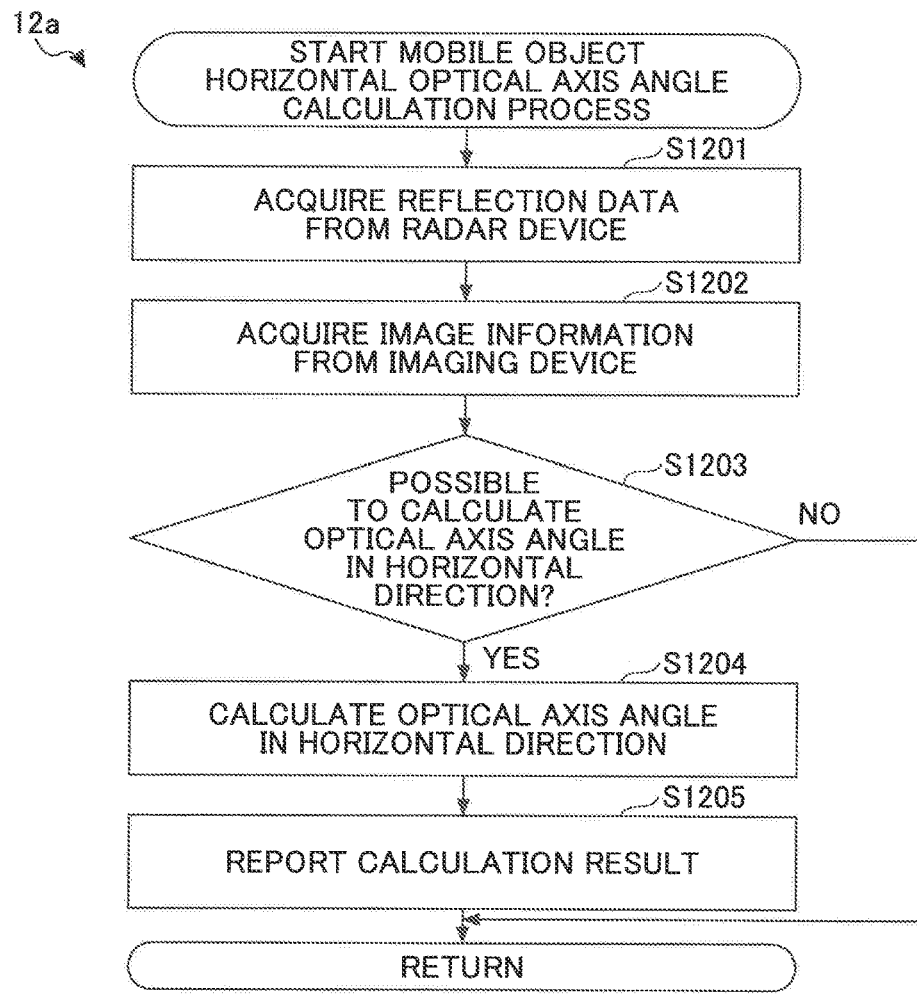
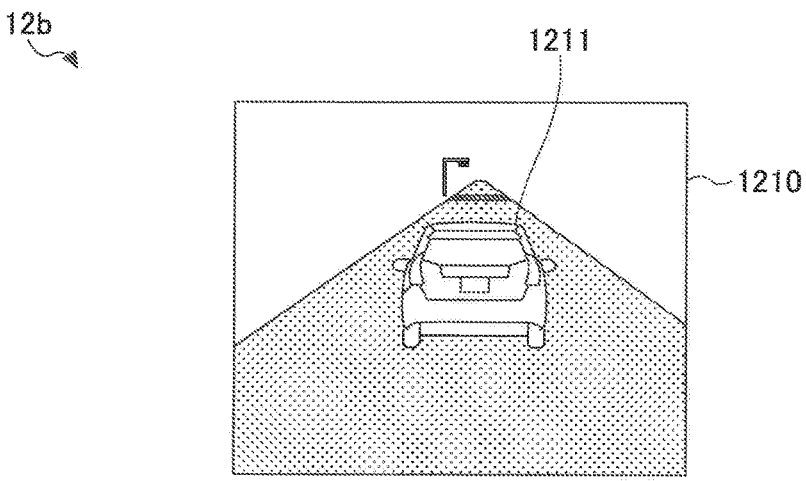

FIG.15
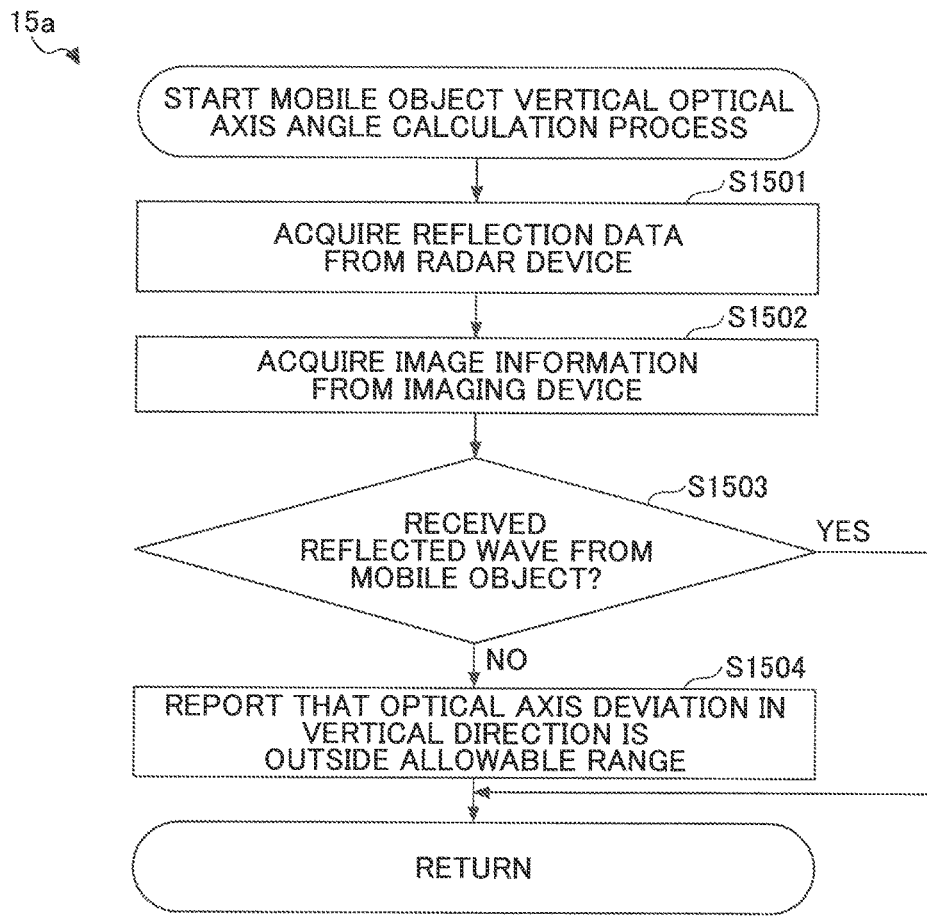
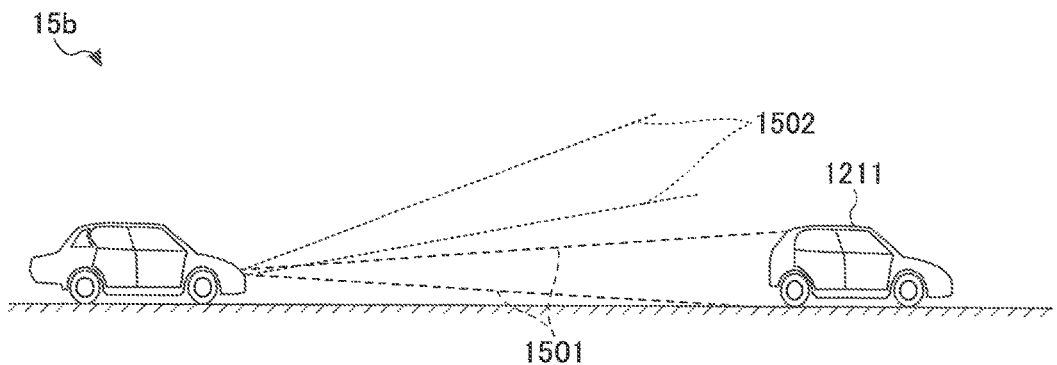

TRAVEL CONTROL DEVICE OF VEHICLE

TECHNICAL FIELD

The present invention relates to a travel control device of a vehicle that restricts or prohibits the travel control of the vehicle.

BACKGROUND ART

Conventionally, there is known a travel control technology such as ACC (Adaptive Cruise Control: constant speed traveling/inter-vehicular distance control device) and a PCS (Pre-Crash Safety System), which performs travel control of a vehicle by using detection results obtained by a radar device.

The travel control technology is constituted to restrict or prohibit the travel control of a vehicle according to a determination result of axis deviation occurring in the radar device, such that a failure does not occur when axis deviation occurs in the radar device.

CITATION LIST

Patent Literature

[PTL 1]
Japanese Unexamined Patent Application Publication No. 2004-345518

SUMMARY OF INVENTION

Technical Problem

However, in the conventional technology, the travel control of a vehicle is restricted or prohibited after the determination of whether an axis deviation has occurred in the radar device is completed, and nothing is disclosed with respect to the travel control of the vehicle until the determination is completed.

On the other hand, there are cases where the axis deviation of the radar device occurs, for example, as another vehicle collides with the vehicle, or an object such as a ball or hand baggage of a pedestrian hits the vehicle, while the vehicle is being parked.

For this reason, when travel control of the vehicle is started after the vehicle is activated, there is a risk that travel control of the vehicle is performed in a state where the axis deviation of the radar device has occurred.

Accordingly, an object of the present disclosure is to avoid a situation where travel control of the vehicle is performed in a state where the axis deviation of the radar device has occurred.

Solution to Problem

According to an aspect of the present disclosure, a travel control device of a vehicle is for restricting or prohibiting execution of travel control of the vehicle based on a detection result obtained by a radar device, the travel control device including a determining unit configured to determine whether an axis deviation has occurred in the radar device based on the detection result obtained by the radar device, when a detection device, which is configured to detect a switch on operation and a switch off operation with respect to an activation switch of the vehicle, detects the switch on operation with respect to the activation switch of the vehicle; and a restricting unit configured to restrict or prohibit the travel control, during a period from when the switch on operation is performed with respect to the activation switch of the vehicle to when the determination of whether the axis deviation has occurred is completed.

Advantageous Effects of Invention

According to the present disclosure, it is possible to avoid a situation where travel control of a vehicle is performed in a state where the axis deviation of the radar device has occurred.

BRIEF DESCRIPTION OF DRAWINGS

FIG. 7 is a diagram for describing details of a stationary object horizontal optical axis angle calculation process.

FIG. 8 is a flowchart illustrating the flow of first restriction information generation process.

FIG. 9 indicates diagrams for describing the restriction of travel control.

FIG. 12 is a diagram for describing details of a mobile object horizontal optical axis angle calculation process.

FIG. 15 is a diagram for describing details of a mobile object vertical optical axis angle calculation process.

DESCRIPTION OF EMBODIMENTS

Figure 1:
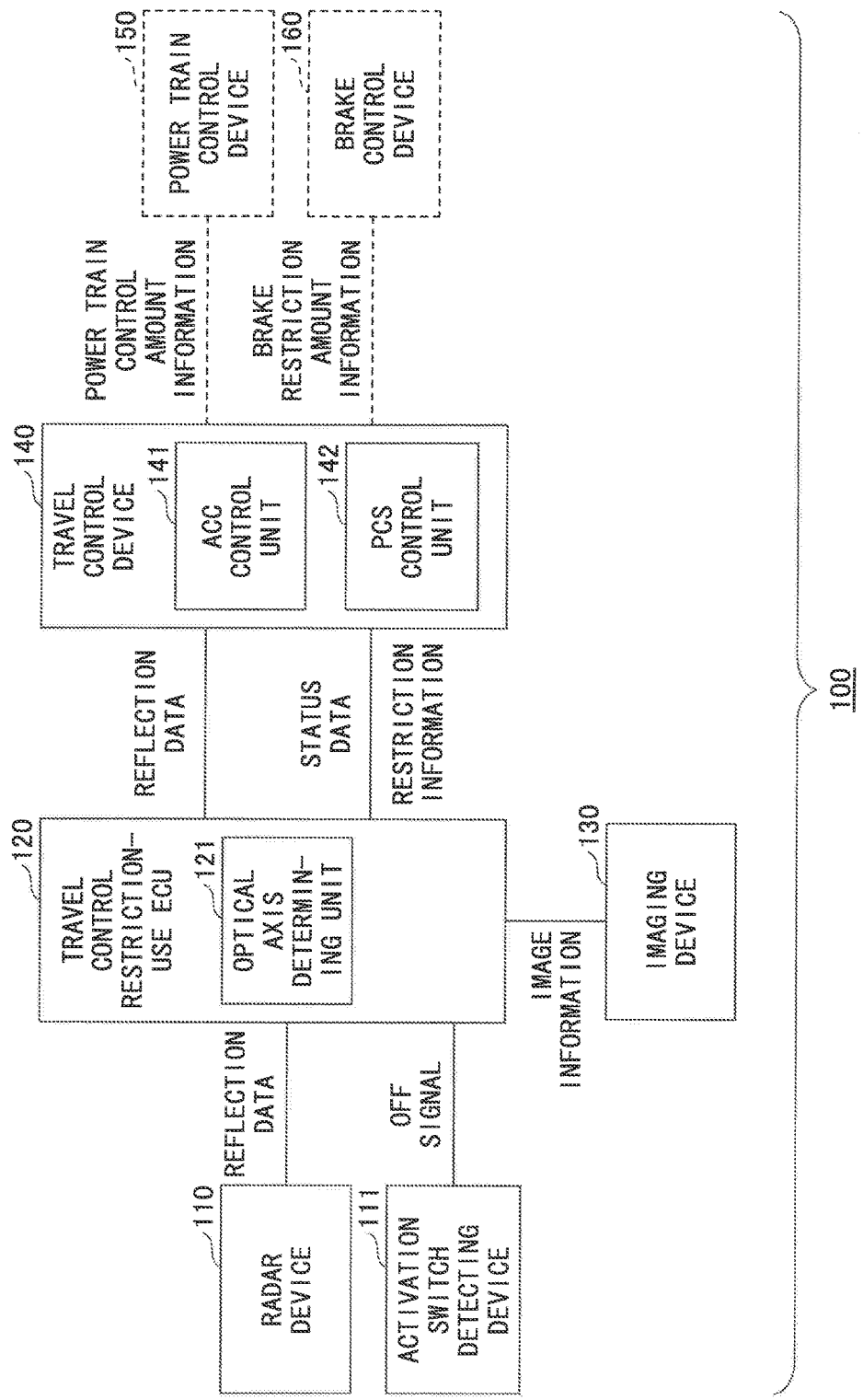
FIG. 1 is a diagram illustrating an example of the overall configuration of a travel control system.

In the following, a description is given of embodiments of the present invention by referring to attached drawings. Note that in the present specification and the drawings, elements having substantially the same functional configurations are denoted by the same reference numerals to omit overlapping descriptions.

[First Embodiment]
<1. Overall Configuration of Travel Control System>
First, a description is given of the overall configuration of a travel control system including an ECU (Electronic Control Unit) used for travel control restriction according to the present embodiment. FIG. 1 is a diagram illustrating an example of the overall configuration of a travel control system. As illustrated in FIG. 1, a travel control system 100 includes a radar device 110, an activation switch detecting device 111, a travel control restriction-use ECU 120, and an imaging device 130. Furthermore, the travel control system 100 includes a travel control device 140, a power train control device 150, and a brake control device 160.

The radar device 110 includes a sending unit for transmitting radio waves of the millimeter waveband, and a receiving unit for receiving reflected waves from an obstacle including a preceding vehicle, etc. The radar device 110 sends reflection data including the reception intensity of the reflected waves received at the receiving unit, the reception position of the reflected waves where the reflected waves are received, and the time until the reflected waves are received after transmitting radio waves, etc., as detection results, to the travel control restriction-use ECU 120.

The activation switch detecting device 111 detects that a switch ON operation has been performed with respect to an activation switch (in the present embodiment, an ignition switch) for activating the vehicle. When the activation switch detecting device 111 detects a switch ON operation of the ignition switch, power starts to be supplied to the respective devices in the travel control system. Furthermore, the activation switch detecting device 111 detects that a switch OFF operation has been performed with respect to the ignition switch. When the activation switch detecting device 111 detects a switch OFF operation of the ignition switch, an off signal is sent to the travel control restriction-use ECU 120. Furthermore, power stops being supplied to the respective devices of the travel control system.

In the travel control restriction-use ECU 120, an optical axis determination program is installed. Accordingly, the travel control restriction-use ECU 120 functions as an optical axis determining unit 121.

The optical axis determining unit 121 determines whether an optical axis deviation has occurred in the radar device 110, based on the reflection data sent from the radar device 110 (and image information sent from the imaging device 130). Note that the optical axis determining unit 121 determines whether an optical axis deviation has occurred in a case where the state of the optical axis of the radar device 110 is determined to be in an uncertain status.

In the present embodiment, "a status where the state of the optical axis of the radar device is uncertain" includes, for example, a case where a switch ON operation has been performed with respect to the ignition switch. This is because there is a possibility that an optical axis deviation may have occurred in the radar device 110, as another vehicle has collided with the vehicle or an object such as a ball and hand baggage of a pedestrian has hit the vehicle, while the ignition switch of the vehicle has been off (while the engine has been stopped, and the vehicle has been parked or the vehicle has been stopped).

That is, there is no assurance that an optical axis deviation has not occurred in the radar device 110, at the time when a switch ON operation is performed with respect to the ignition switch of the vehicle for the first time, and therefore the optical axis determining unit 121 determines whether an optical axis deviation has occurred.

Furthermore, in the present embodiment, "a status where the state of the optical axis of the radar device is uncertain" includes, for example, a case where the PCS is actuated in the travel control device 140 based on the detection result of the radar device 110 (after PCS actuation). Alternatively, "a status where the state of the optical axis of the radar device is uncertain" includes a case where the travel control device 140 determines that an obstacle is approaching the vehicle at or within a predetermined distance, based on the detection result of the radar device 110. Note that PCS is an abbreviation of a pre-crash safety system.

After the PCS actuation, or when the travel control device 140 determines that an obstacle is approaching the vehicle at or within a predetermined distance, it can be said that a status, in which a collision with an obstacle may happen, has occurred. Assuming that a collision has happened, there is a high probability that an optical axis deviation has occurred in the radar device 110. Therefore, when such a status has occurred, the optical axis determining unit 121 determines whether an optical axis deviation has occurred.

Note that the optical axis determining unit 121 recognizes that the PCS has been actuated or an obstacle is determined to be approaching at or within a predetermined distance, by receiving status data from the travel control device 140.

Furthermore, when the optical axis determining unit 121 starts determining whether an optical axis deviation has occurred in the radar device 110, the optical axis determining unit 121 sends restriction information to the travel control device 140. Restriction information is information for restricting or prohibiting travel control such as ACC and PCS, etc., executed in the travel control device 140. Note that ACC is an abbreviation of Adaptive Cruise Control (constant speed traveling/inter-vehicular distance control device).

The imaging device 130 captures images of a predetermined range including the radio wave radiation range of the radar device 110. Image information, which is obtained as images are captured by the imaging device 130, is sent to the travel control restriction-use ECU 120.

The travel control device 140 executes travel control of a vehicle, based on detection results of the radar device 110. The travel control device 140 includes an ACC control unit 141 and a PCS control unit 142.

The ACC control unit 141 executes control such that the vehicle travels at a vehicle speed set by the driver, by sending power train control amount information to the power train control device 150. Furthermore, the ACC control unit 141 executes control such that the distance between the vehicle and a preceding vehicle becomes fixed, by sending brake restriction amount information to the brake control device 160. According to the ACC control unit 141, it is possible to realize travel control such that the vehicle travels at a constant speed while maintaining a fixed distance to a preceding vehicle (constant speed traveling/inter-vehicular distance control).

The PCS control unit 142 sends brake restriction amount information to the brake control device 160, when the PCS control unit 142 determines that there is a risk of colliding with a preceding vehicle. According to the PCS control unit 142, it is possible to realize travel control to support the operation of avoiding a collision with an obstacle such as a preceding vehicle (collision avoidance support control).

Note that the example of FIG. 1 has a configuration in which the radar device 110 and the imaging device 130 are coupled to the travel control restriction-use ECU 120 such that various types of data and information are input from these devices to the travel control restriction-use ECU 120. However, these devices may be coupled to the travel control device 140, etc., and various types of data and information from these devices may be input to the travel control restriction-use ECU 120 via the travel control device 140, etc.

Furthermore, the example of FIG. 1 has a configuration in which the power train control device 150 and the brake control device 160 are coupled to the travel control device 140, and the ACC control unit 141 and the PCS control unit 142 control the power train control device 150 and the brake control device 160. However, the target of control by the ACC control unit 141 and the PCS control unit 142 are not limited to the power train control device 150 and the brake control device 160; the ACC control unit 141 and the PCS control unit 142 may be configured to control other devices.

Furthermore, the example of FIG. 1 has a configuration in which the travel control restriction-use ECU 120 is provided as a separate body from the travel control device 140. However, the functions realized by the travel control restriction-use ECU 120 may be realized, for example, in the travel control device 140, and the travel control restriction-use ECU 120 may be constituted integrally with the travel control device 140. In this case, the travel control device 140 also functions as the optical axis determining unit 121. However, whether the travel control restriction-use ECU 120 and the travel control device 140 are constituted integrally or constituted separately, the travel control restriction-use ECU 120 and the travel control device 140 are included in the travel control device in a broad sense, in terms of being a device for performing travel control on the vehicle.

<2. Hardware Configuration of Travel Control Restriction-use ECU>

Figure 2:
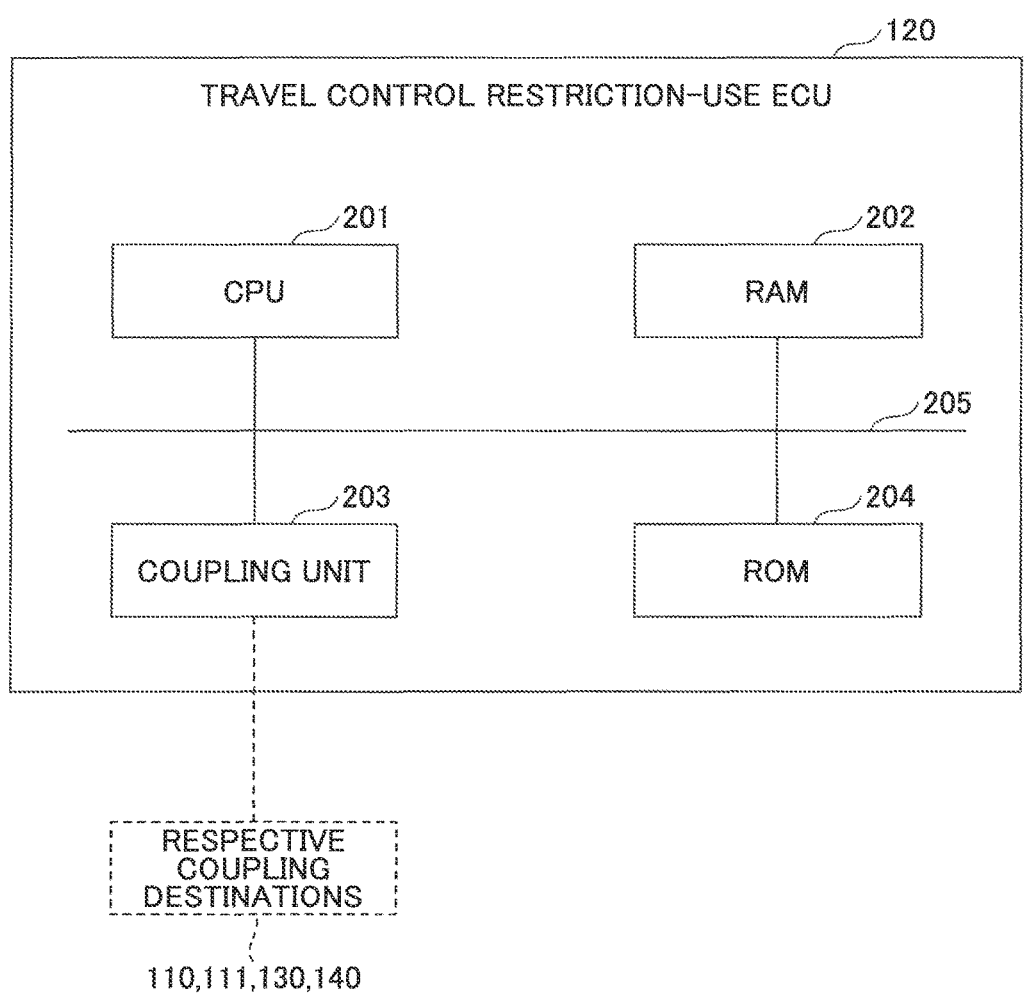
FIG. 2 is a diagram illustrating an example of a hardware configuration of the travel control restriction-use ECU.

Next, a description is given of a hardware configuration of the travel control restriction-use ECU 120. FIG. 2 is a diagram illustrating an example of a hardware configuration of the travel control restriction-use ECU 120.

As illustrated in FIG. 2, the travel control restriction-use ECU 120 includes a CPU (Central Processing Unit) 201, a RAM (Random Access Memory) 202, a coupling unit 203, and a ROM (Read Only Memory) 204. Note that it is assumed that the respective units of the travel control restriction-use ECU 120 are coupled to each other via a bus 205.

The CPU 201 is a computer that executes various types of programs (an optical axis determination program, etc.) stored in the ROM 204.

The RAM 202 is a main memory such as a DRAM (Dynamic Random Access Memory) and a SRAM (Static Random Access Memory), etc. The RAM 202 functions as a work area that is expanded when various types of programs stored in the ROM 204 are executed by the CPU 201. Furthermore, the RAM 202 functions as a storage area for temporarily storing information (for example, restriction information, etc.) that is generated as various types of programs stored in the ROM 204 are executed by the CPU 201.

The coupling unit 203 is coupled with various coupling destinations such as the radar device 110, the imaging device 130, and the travel control device 140, etc., and is an interface for sending and receiving various types of data and information between various coupling destinations.

The ROM 204 is a main memory such as an EPROM and an EEPROM, etc., and stores various programs executed by the CPU 201 and information, etc., that is used as various programs are executed.

<3. Operations of Travel Control System>

Figure 3:
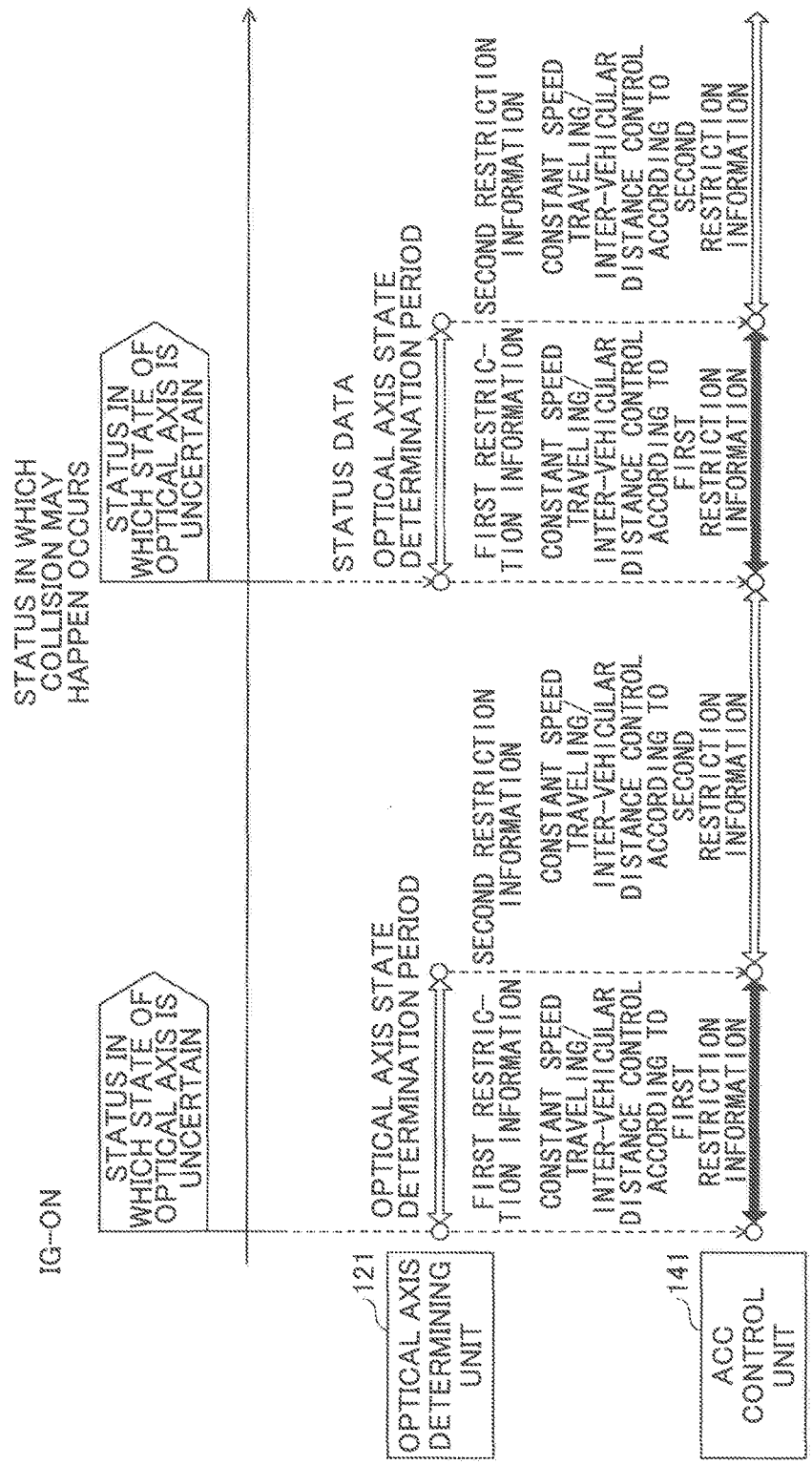
FIG. 3 is a diagram for describing the operations of the travel control system.

Next, a description is given of operations of the travel control system 100. FIG. 3 is a diagram for describing the operations of the travel control system 100.

As illustrated in FIG. 3, when a switch ON operation is performed with respect to an ignition switch (IG) of a vehicle, the optical axis determining unit 121 starts to determine the state of the optical axis (determine whether an optical axis deviation has occurred). At this time, the optical axis determining unit 121 sends first restriction information to the travel control device 140. First restriction information is, for example, restriction information for restricting or prohibiting the constant speed traveling/inter-vehicular distance control by the ACC control unit 141 until the determination of whether an optical axis deviation has occurred is completed.

The ACC control unit 141 executes constant speed traveling/inter-vehicular distance control according to the first restriction information. The determination of the state of the optical axis by the optical axis determining unit 121 takes a certain amount of time. Therefore, during the optical axis state determination period, the ACC control unit 141 executes constant speed traveling/inter-vehicular distance control according to the first restriction information, to avoid a situation where a failure occurs in the constant speed traveling/inter-vehicular distance control due to the optical axis deviation.

Then, once the determination of the state of the optical axis by the optical axis determining unit 121 is completed, the optical axis determining unit 121 sends second restriction information according to the determination result, to the ACC control unit 141. The second restriction information is restriction information according to the result of determining the state of the optical axis by the optical axis determining unit 121. Specifically, the second restriction information is information for restricting or prohibiting the constant speed traveling/inter-vehicular distance control by the ACC control unit 141. Alternatively, if it is determined that an optical axis deviation has not occurred, the second restriction information is information for executing the constant speed traveling/inter-vehicular distance control by the ACC control unit 141 without any restriction.

The ACC control unit 141 restricts or prohibits the constant speed traveling/inter-vehicular distance control or executes the constant speed traveling/inter-vehicular distance control without any restriction, according to the second restriction information. When the determination of the state of the optical axis is completed and the optical axis state determination period is ended, the state of the optical axis of the radar device 110 becomes a definite status. Accordingly, the ACC control unit 141 executes constant speed traveling/inter-vehicular distance control according to the state of the optical axis that has become definite (second restriction information).

As described above, in the present embodiment, the travel control executed by the travel control device 140 is not only restricted or prohibited after the determination with respect to the state of the optical axis is completed, but may also be restricted or prohibited during the period until the determination with respect to the state of the optical axis is completed. As a result, it is possible to avoid a situation where a failure occurs in the travel control of the vehicle due to an optical axis deviation in the radar device 110.

Note that the same applies to a case where, as illustrated in FIG. 3, a status in which a collision may happen occurs (because the PCS is actuated, etc.), and status data is sent by the travel control device 140. That is, in this case also, the optical axis determining unit 121 restricts or prohibits the travel control by the travel control device 140 according to the first restriction information until the determination with respect to the state of the optical axis is completed. Then, after the determination is completed, the optical axis determining unit 121 restricts or prohibits the travel control by the travel control device 140, or causes the travel control device 140 to execute the travel control without restriction, according to the second restriction information.

<4. Functional Configuration of Travel Control Restriction-use ECU>

Figure 4:
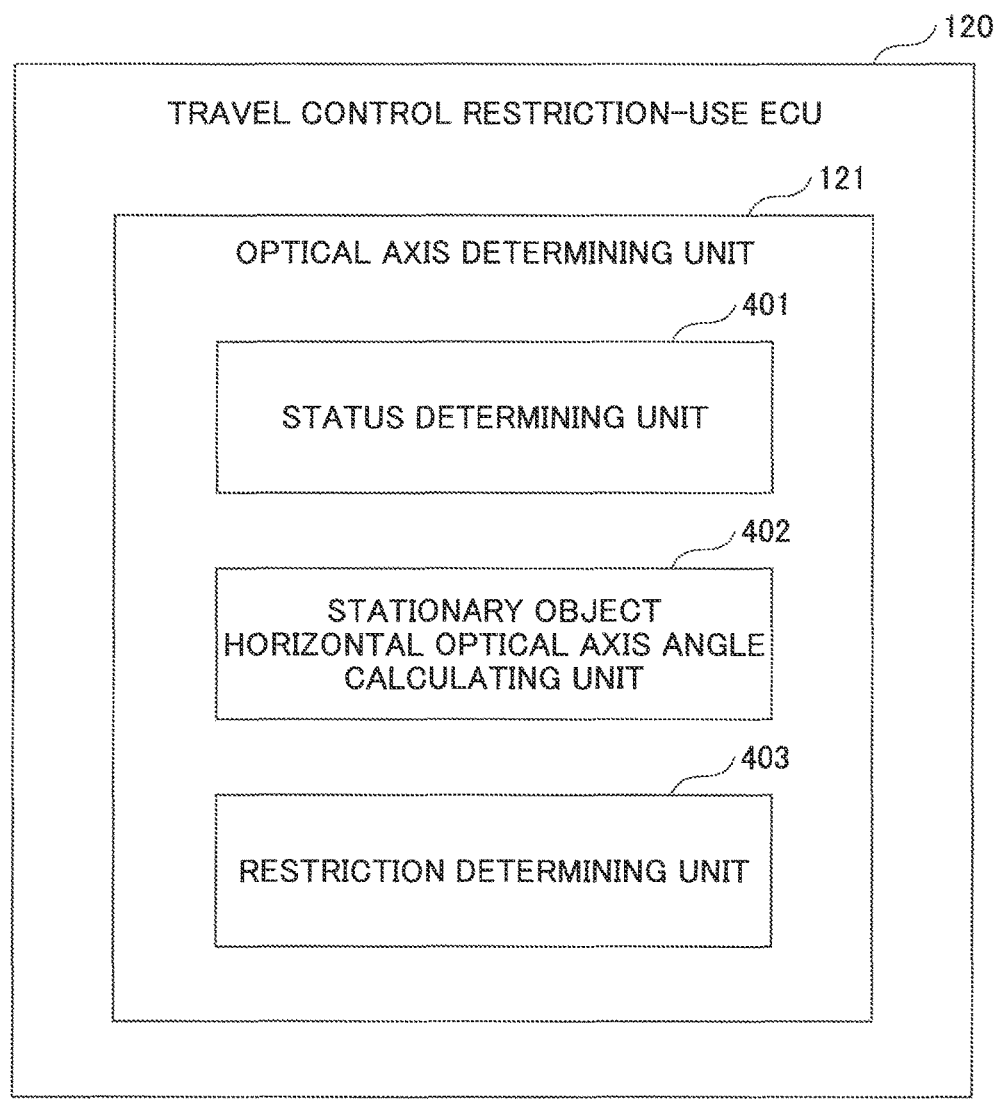
FIG. 4 is a diagram illustrating an example of the functional configuration of the travel control restriction-use ECU according to a first embodiment.

Next, a description is given of the functional configuration of the travel control restriction-use ECU 120. FIG. 4 is a diagram illustrating an example of the functional configuration of the travel control restriction-use ECU 120 according to the first embodiment. As illustrated in FIG. 4, the optical axis determining unit 121 includes a status determining unit 401, a stationary object horizontal optical axis angle calculating unit 402, and a restriction determining unit 403.

The status determining unit 401 determines whether the state of the optical axis of the radar device 110 has become an uncertain status. Specifically, the status determining unit 401 determines whether the optical axis determining unit 121 has been activated, as a switch ON operation is performed with respect to an ignition switch of the vehicle and power is supplied to the travel control restriction-use ECU 120. Furthermore, the status determining unit 401 determines whether status data has been sent from the travel control device 140.

Note that it is assumed that the status data is sent from the travel control device 140 after the PCS actuation in the travel control device 140 or when it is determined that an obstacle is approaching at or within a predetermined distance based on the detection result of the radar device 110.

The stationary object horizontal optical axis angle calculating unit 402 calculates the optical axis angle in the horizontal direction in the radar device 110, based on reflection data sent from the radar device 110. For example, in a state where the vehicle is travelling in a straight line, it is assumed that the radar device 110 transmits radio waves for a plurality of times, and that the radar device 110 receives reflected waves for a plurality of times from a plurality of obstacles set on the roadside. In this case, if an optical axis deviation has not occurred in the radar device 110, the obstacles are recognized as being set along a linear line in the travelling direction. Conversely, if an optical axis deviation has occurred in the radar device 110, the obstacles are recognized as being set at positions deviated from positions along a linear line in the travelling direction. The stationary object horizontal optical axis angle calculating unit 402 calculates the optical axis angle in the horizontal direction, based on this displacement amount.

The restriction determining unit 403 generates first restriction information and second restriction information for restricting or prohibiting the execution of the travel control by the travel control device 140, and sends the first restriction information and the second restriction information to the travel control device 140. The restriction determining unit 403 generates first restriction information according to attributes of the vehicle until the optical axis angle in the horizontal direction is calculated by the stationary object horizontal optical axis angle calculating unit 402, and sends the generated first restriction information to the travel control device 140.

Furthermore, when the stationary object horizontal optical axis angle calculating unit 402 calculates the optical axis angle in the horizontal direction, the restriction determining unit 403 calculates the deviation amount of the optical axis angle in the horizontal direction, and generates the second restriction information according to the deviation amount. Furthermore, the restriction determining unit 403 sends the generated second restriction information to the travel control device 140.

<5. Flow of Status Determination Process by Status Determining Unit>

Figure 5:
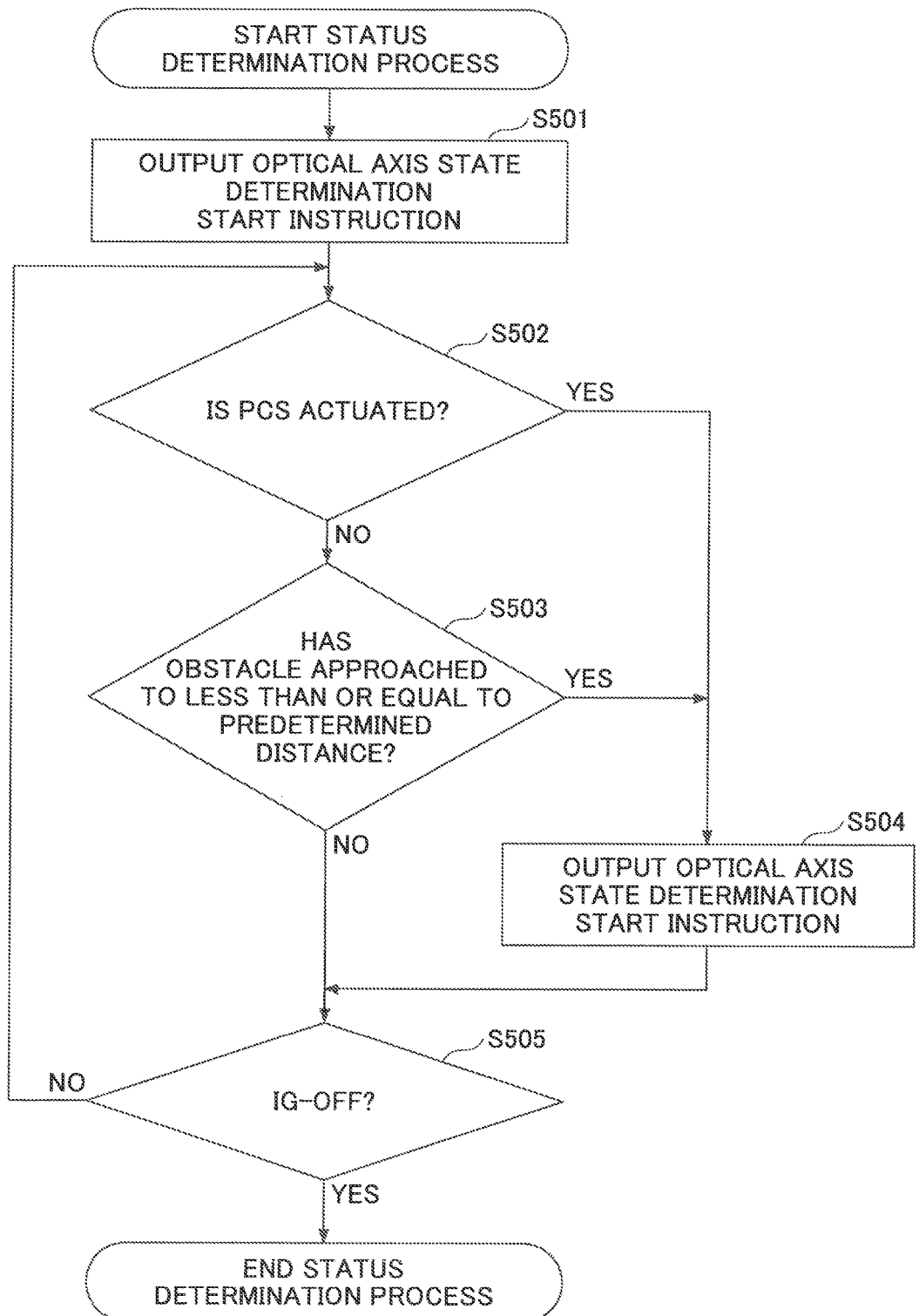
FIG. 5 is a flowchart illustrating the flow of a status determination process by a status determining unit.

Next, a description is given of the flow of the status determination process by the status determining unit 401. FIG. 5 is a flowchart illustrating the flow of the status determination process by the status determining unit 401.

When a switch ON operation is performed with respect to the ignition switch of the vehicle, and the optical axis determining unit 121 is activated as power is supplied to the travel control restriction-use ECU 120, the status determination process illustrated in FIG. 5 is started. In step S501, the status determining unit 401 outputs an optical axis state determination start instruction to the restriction determining unit 403.

In step S502, the status determining unit 401 determines whether status data (status data that is output after the PCS is actuated) has been received. In step S502, when the status determining unit 401 determines that the status data has been received, the process proceeds to step S504.

Conversely, in step S502, when the status determining unit 401 determines that the status data has not been received, the process proceeds to step S503. In step S503, the status determining unit 401 determines whether the status data (status data that is output in a case where an obstacle is determined to be approaching the vehicle at or within a predetermined distance) has been received. In step S503, when the status determining unit 401 determines that the status data has been received, the process proceeds to step S504.

In step S504, the status determining unit 401 outputs an optical axis state determination start instruction to the restriction determining unit 403.

Conversely, in step S503, when the status determining unit 401 determines that the status data has not been received, the process proceeds to step S505. In step 3505, the status determining unit 401 determines whether a switch OFF operation has been performed with respect to the ignition switch. In step S505, when the status determining unit 401 determines that a switch OFF operation has not been performed, the process returns to step S502. Conversely, when the status determining unit 401 determines that a switch OFF operation has been performed, the status determination process is ended.

As described above, when a switch ON operation is performed with respect to the ignition switch, the status determining unit 401 outputs an optical axis state determination start instruction. Then, subsequently, until a switch OFF operation is performed with respect to the ignition switch, the status determining unit 401 outputs an optical axis state determination start instruction every time status data is received.

<6. Flow of Restriction Determination Process>

Figure 6:
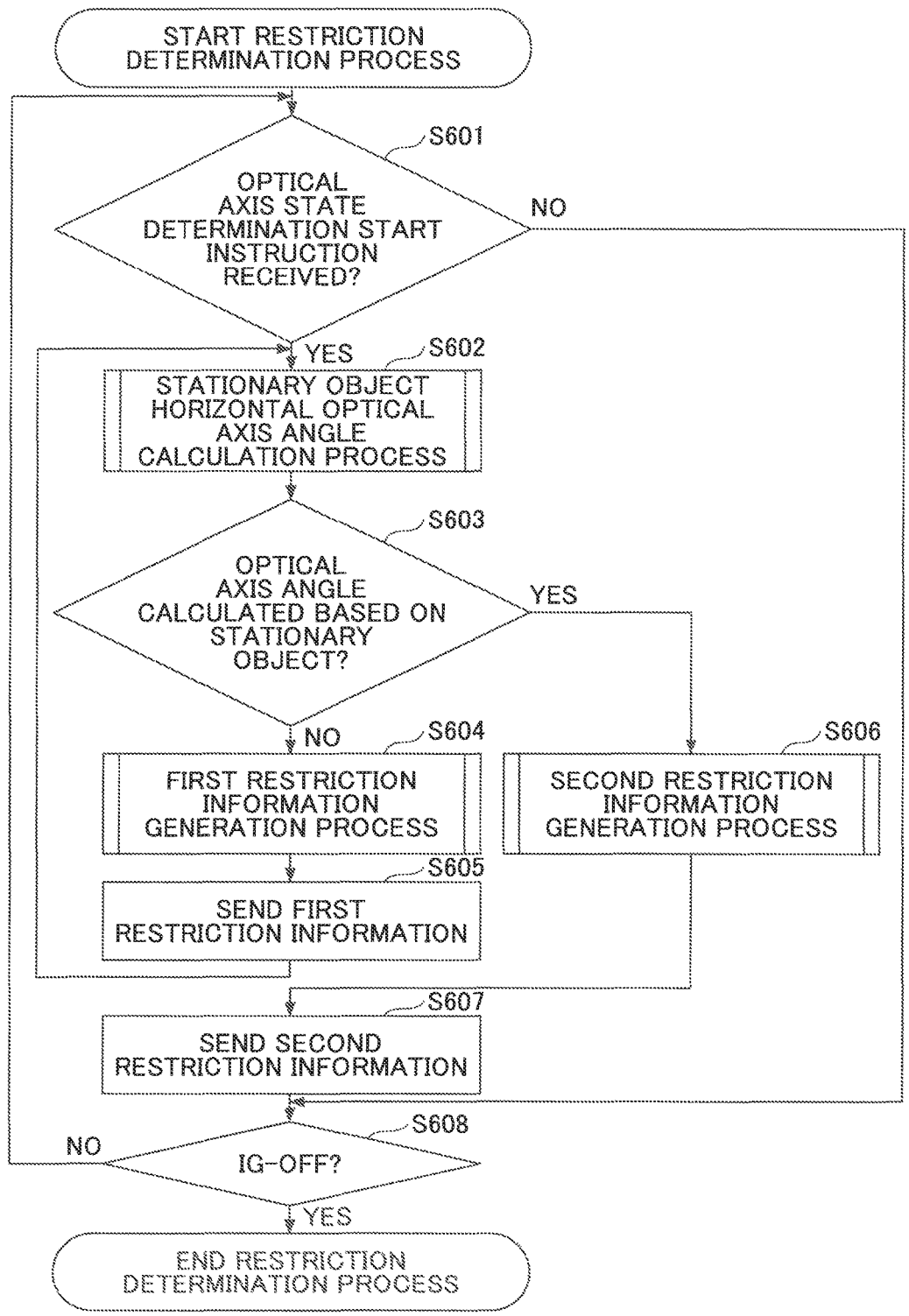
FIG. 6 is a flowchart illustrating the flow of a restriction determination process according to the first embodiment.

Next, a description is given of the flow of the restriction determination process according to the first embodiment. FIG. 6 is a flowchart illustrating the flow of the restriction determination process according to the first embodiment.

When the optical axis determining unit 121 is activated as power is supplied to the travel control restriction-use ECU 120, the restriction determination process illustrated in FIG. 6 is started. In step S601, the restriction determining unit 403 determines whether an optical axis state determination start instruction has been received from the status determining unit 401. In step S601, when the restriction determining unit 403 determines that an optical axis state determination start instruction has been received, the process proceeds to step S602.

In step S602, the stationary object horizontal optical axis angle calculating unit 402 executes a stationary object horizontal optical axis angle calculation process. Note that details of the stationary object horizontal optical axis angle calculation process are described below.

In step S603, the stationary object horizontal optical axis angle calculating unit 402 determines whether the optical axis angle has been calculated based on the stationary object. In step S603, when the stationary object horizontal optical axis angle calculating unit 402 determines that the optical axis angle has not been calculated, the process proceeds to step S604.

In step S604, the restriction determining unit 403 executes a first restriction information generation process, and generates first restriction information. Note that details of the first restriction information generation process are described below.

In step S605, the restriction determining unit 403 sends the first restriction information to the travel control device 140, and then the process returns to step S602. Accordingly, until the stationary object horizontal optical axis angle calculating unit 402 calculates an optical axis angle based on a stationary object, the restriction determining unit 403 sends the generated first restriction information to the travel control device 140. Note that in the example of FIG. 6, the first restriction information is sent for a plurality of times until the optical axis angle is calculated; however, the first restriction information may be sent only once every time an optical axis state determination start instruction is received once.

Conversely, in step S603, when the stationary object horizontal optical axis angle calculating unit 402 determines that the optical axis angle has been calculated, the process proceeds to step S606. In step S606, the restriction determining unit 403 generates second restriction information based on the calculated optical axis angle in the horizontal direction. Note that details of the second restriction information generation process are described below.

In step S607, the restriction determining unit 403 sends the second restriction information to the travel control device 140, and then the process proceeds to step S608.

Conversely, in step S601, when the restriction determining unit 403 determines that an optical axis state determination start instruction has not been received, the process directly proceeds to step S608. In step S608, the restriction determining unit 403 determines whether a switch OFF operation has been performed with respect to the ignition switch, and when the restriction determining unit 403 determines that a switch OFF operation has not been performed, the process returns to step S601. Conversely, when the restriction determining unit 403 determines that a switch OFF operation has been performed, the restriction determination process is ended.

<7. Details of Respective Processes Included in Restriction Determination Process>

Next, a description is given of details of the respective processes (stationary object horizontal optical axis angle calculation process (step S602), first restriction information generation process (step S604), and second restriction information generation process (step S606)) included in the restriction determination process (FIG. 6).

<7.1 Description of Stationary Object Horizontal Optical Axis Angle Calculation Process>

First, a description is given of details of the stationary object horizontal optical axis angle calculation process (step S602) by referring to FIG. 7. 7a in FIG. 7 is a flowchart illustrating the flow of the stationary object horizontal optical axis angle calculation process by the stationary object horizontal optical axis angle calculating unit 402.

In step S701, the stationary object horizontal optical axis angle calculating unit 402 acquires reflection data from the radar device 110.

In step S702, the stationary object horizontal optical axis angle calculating unit 402 determines whether it is possible to calculate the optical axis angle in the horizontal direction.

7b in FIG. 7 is a diagram that depicts a method of calculating an optical axis angle in the horizontal direction based on the reflection data acquired from the radar device 110. Here, as illustrated in 7b of FIG. 7, it is assumed that a plurality of stationary objects (obstacles 711 through 714 and 721 through 724) are provided along each side of the road (left side and right side) of a road along which a vehicle 701 is travelling.

In this case, when radio waves are transmitted from the radar device 110 for a plurality of times while the vehicle 701 is traveling, the radar device 110 receives reflected waves from the respective obstacles 711 through 714 and 721 through 724.

In this case, assuming that an optical axis deviation has not occurred in the radar device 110 (in the case of a radiation range 702), the obstacles 711 through 714 and 721 through 724 are recognized as being set along a linear line in the travelling direction of the vehicle 701.

Conversely, assuming that an optical axis deviation has occurred in the radar device 110 (in the case of a radiation range 703), the obstacles 711 through 714 and 721 through 724 are recognized as being set at positions deviated from positions along a linear line in the travelling direction of the vehicle 701.

Accordingly, the stationary object horizontal optical axis angle calculating unit 402 calculates the optical axis angle in the horizontal direction based on the deviation amount from the positions along a linear line in the travelling direction.

Referring back the description of 7a in FIG. 7, in step S702, when the stationary object horizontal optical axis angle calculating unit 402 determines that it is not possible to calculate the optical axis angle in the horizontal direction, the process returns to step S603 of FIG. 6. Specifically, when it has not been possible to calculate the distances to the obstacles 711 through 714 on the left side or the obstacles 721 through 724 on the right side, the stationary object horizontal optical axis angle calculating unit 402 determines that it is not possible to calculate the optical axis angle in the horizontal direction. Note that a case where it has not been possible to calculate the distances to the obstacles 711 through 714 on the left side or the obstacles 721 through 724 on the right side is, for example, a case where the obstacles 711 through 714 and 721 through 724 are not present on the roadsides of the road along which the vehicle is travelling. Alternatively, there is a case where the obstacles 711 through 714 and 721 through 724 are present along the roadsides but reflected waves have not been received.

Conversely, in step S702, when the stationary object horizontal optical axis angle calculating unit 402 determines that it is possible to calculate the optical axis angle in the horizontal direction, the process proceeds to step S703.

In step S703, the stationary object horizontal optical axis angle calculating unit 402 calculates the optical axis angle in the horizontal direction in the radar device 110, based on the reflection data acquired in step S701.

In step S704, the stationary object horizontal optical axis angle calculating unit 402 reports the calculation result (optical axis angle in horizontal direction) to the restriction determining unit 403, and then the process returns to step S603 of FIG. 6.

<7.2 First and Second Restriction Information Generation Processes by Restriction Determining Unit>

Next, a description is given of the flow of the first and second restriction information generation processes by the restriction determining unit 403. 8a of FIG. 8 is a flowchart illustrating the flow of the first restriction information generation process by the restriction determining unit 403. In step S801, the restriction determining unit 403 determines whether the vehicle 701 is a vehicle in which an optical axis deviation is likely to occur. Note that it is assumed that the likelihood of the occurrence of an optical axis deviation is defined in advance for each vehicle.

In step S801, when the restriction determining unit 403 determines that the vehicle 701 is a vehicle in which an optical axis deviation is likely to occur, the process proceeds to step S802. In step S802, the restriction determining unit 403 inputs, for example, "prohibit ACC control" in the first restriction information, and the process returns to step S605 of FIG. 6.

Conversely, in S801, when the restriction determining unit 403 determines that the vehicle 701 is a vehicle in which an optical axis deviation is not likely to occur, the process proceeds to step S803. In step S803, the restriction determining unit 403 inputs "there is preceding vehicle selected distance restriction" in the first restriction information, and then the process returns to step S605 of FIG. 6.

8b of FIG. 8 is a flowchart illustrating the flow of the second restriction information generation process by the restriction determining unit 403. In step S811, the restriction determining unit 403 calculates the deviation amount of the optical axis angle, based on the calculated optical axis angle in the horizontal direction.

In step S812, the restriction determining unit 403 determines whether the deviation amount of the optical axis angle is greater than or equal to a predetermined threshold. In step S812, when the restriction determining unit 403 determines that the deviation amount of the optical axis angle is greater than or equal to a predetermined threshold, the process proceeds to step S813. In step S813, the restriction determining unit 403 inputs, for example, "prohibit ACC control" in the second restriction information, and then the process returns to step S607 in FIG. 6.

Conversely, in step S812, when the restriction determining unit 403 determines that the deviation amount of the optical axis angle is not greater than or equal to a predetermined threshold, the process proceeds to step S814. In step S814, the restriction determining unit 403 determines whether an optical axis deviation has not occurred. In step S814, when the restriction determining unit 403 determines that an optical axis deviation has occurred, the process proceeds to step S815. In step S815, the restriction determining unit 403 inputs "there is preceding vehicle selected distance restriction" in the second restriction information, and then the process returns to step S607.

Conversely, in step S814, when the when the restriction determining unit 403 determines that an optical axis deviation has not occurred, the process proceed to step S816. In step S816, the restriction determining unit 403 inputs "no preceding vehicle selected distance restriction" in the second restriction information, and then the process returns to step S607 of FIG. 6.

<8. Restriction in Travel Control Device 140>

Next, a description is given of details of the travel control based on the first and second restriction information sent from the travel control restriction-use ECU 120. Note that, for example, when the first and second restriction information includes "prohibit ACC control", the ACC control unit 141 prohibits the constant speed traveling/inter-vehicular distance control. Furthermore, when the second restriction information includes "no preceding vehicle selected distance restriction", the ACC control unit 141 executes travel control without restriction. Therefore, detailed descriptions of these cases are omitted, and in the following, a description is given of details of a case where "there is preceding vehicle selected distance restriction" is included in the first and second restriction information.

FIG. 9 indicates diagrams for describing the restriction of travel control in a case where "there is preceding vehicle selected distance restriction" is included in the first and second restriction information.

Among these, 9a in FIG. 9 illustrates the radiation range of a case where an optical axis deviation in the horizontal direction has occurred. As illustrated in 9a in FIG. 9, when an optical axis deviation in the horizontal direction has occurred, the radio waves transmitted from the vehicle 701 are reflected from a vehicle 901 travelling along an adjacent lane. In this case, the vehicle 701 erroneously detects the vehicle 901 as a preceding vehicle.

On the other hand, 9b in FIG. 9 illustrates a case where the travel control is restricted as the travel control device 140 has received restriction information including "there is preceding vehicle selected distance restriction". In 9b in FIG. 9, a hatching region 910 indicates a region where the reflection data is masked. As illustrated in 9b in FIG. 9, the reflection data is masked in the hatching region 910 to restrict the detection range of reflected waves, and therefore it is possible to eliminate situations where the vehicle 901, which is traveling in an adjacent lane, is recognized as a preceding vehicle. That is, it is possible to avoid a situation where a failure occurs in the travel control of the vehicle 701 due to an optical axis deviation in the radar device 110.

Here, a distance L from the vehicle 701 to the hatching region 910 can be obtained, for example, by the following formula, where θ is the deviation amount (angle) of the optical axis angle and the lane width is W.

$$L = W/2/\tan\theta$$

Note that the example of FIG. 9 illustrates a case where the radio waves are transmitted from the radar device 110 with a predetermined broadness; however, for example, the radio waves transmitted from the radar device 110 may be radio waves having a directivity, to scan the area in a horizontal direction.

<9. Summary>

As is clear from the above descriptions, the travel control restriction-use ECU 120 according to the present embodiment has the following configurations.

When a switch ON operation is performed with respect to the ignition switch, after the PCS actuation, and when an obstacle is determined to be approaching the vehicle at or within a predetermined distance, first restriction information is sent. Furthermore, travel control executed by the travel control device is restricted or prohibited, and it is determined whether an optical axis deviation has occurred in the radar device.

Second restriction information is generated according to a determination result of whether an optical axis deviation has occurred in the radar device, and the generated restriction information is sent to the travel control device, so that after the determination is completed, the travel control by the travel control device is restricted, prohibited, or executed without restriction.

Accordingly, according to the present embodiment, it is possible to restrict or prohibit the travel control by the travel control device, not only after determining whether an optical axis deviation has occurred, but also while determining whether an optical axis deviation has occurred.

As a result, it is possible to avoid a situation where a failure occurs in the travel control of the vehicle due to an optical axis deviation in the radar device.

[Second Embodiment]

The first embodiment described above has a configuration in which the optical axis angle in the horizontal direction in the radar device 110 is calculated based on a stationary object. However, in the second embodiment, a configuration of calculating the optical axis angle in the horizontal direction in the radar device 110 based on a mobile object (an obstacle such as a preceding vehicle) is further added. In the following description of the second embodiment, the points that are different from the first embodiment are mainly described.

<1. Functional Configuration of Travel Control Restriction-use ECU>

Figure 10:
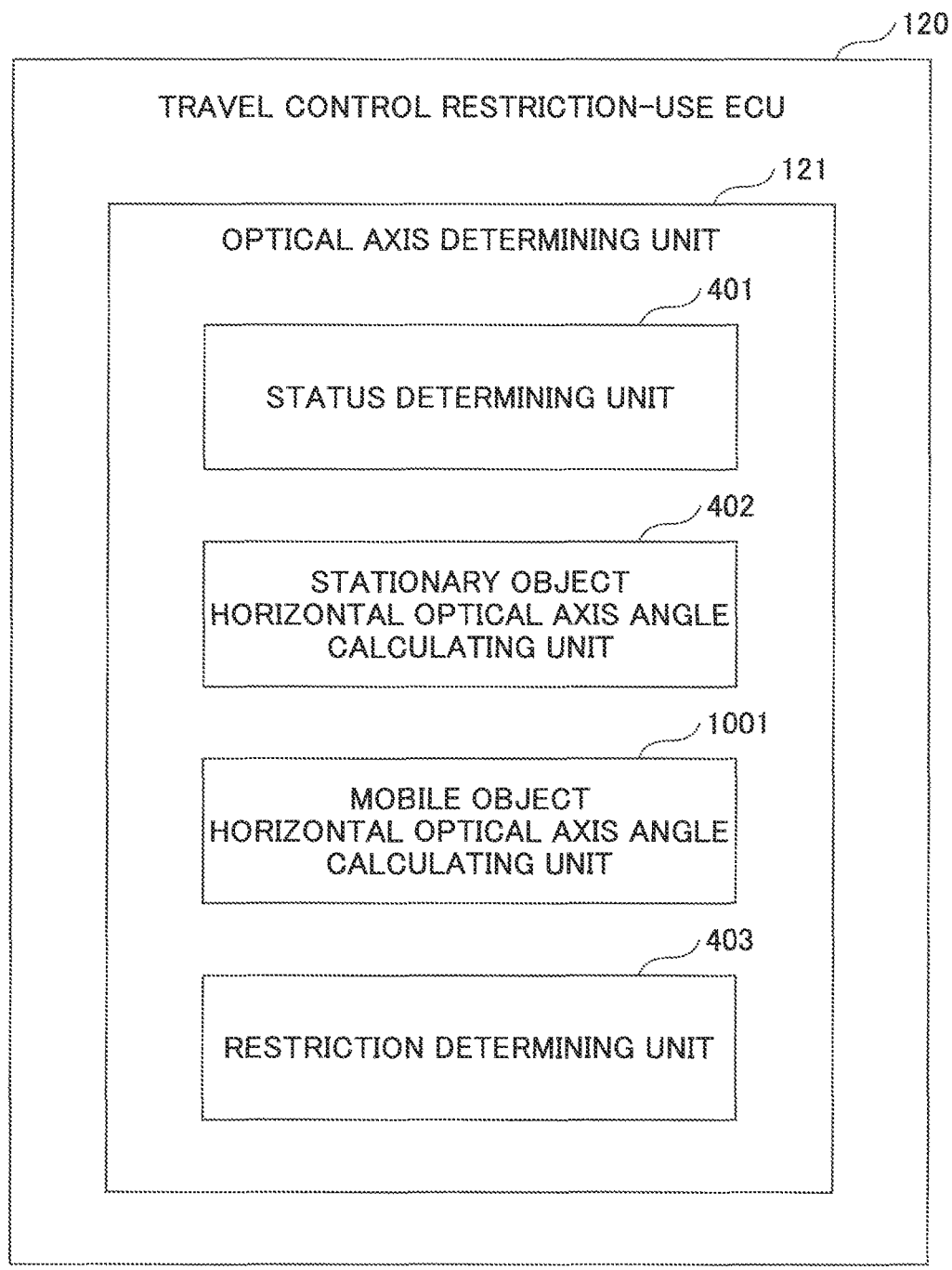
FIG. 10 is a diagram illustrating an example of the functional configuration of the travel control restriction-use ECU according to a second embodiment.

First, a description is given of the functional configuration of the travel control restriction-use ECU 120 according to the second embodiment. FIG. 10 is a diagram illustrating an example of the functional configuration of the travel control restriction-use ECU 120 according to the second embodiment. The difference from the functional configuration of the travel control restriction-use ECU 120 according to the first embodiment described by referring to FIG. 4 is that the optical axis determining unit 121 includes a mobile object horizontal optical axis angle calculating unit 1001.

The mobile object horizontal optical axis angle calculating unit 1001 calculates the optical axis angle in the horizontal direction in the radar device 110 based on reflection data sent from the radar device 110 and image information sent from the imaging device 130. For example, the mobile object horizontal optical axis angle calculating unit 1001 recognizes a preceding vehicle based on image information sent from the imaging device 130, and uses the reflection data including the reception position of radio waves from a preceding vehicle among the reflection data sent from the radar device 110 to calculate the optical axis angle in the horizontal direction in the radar device 110.

<2. Flow of Restriction Determination Process>

Figure 11:
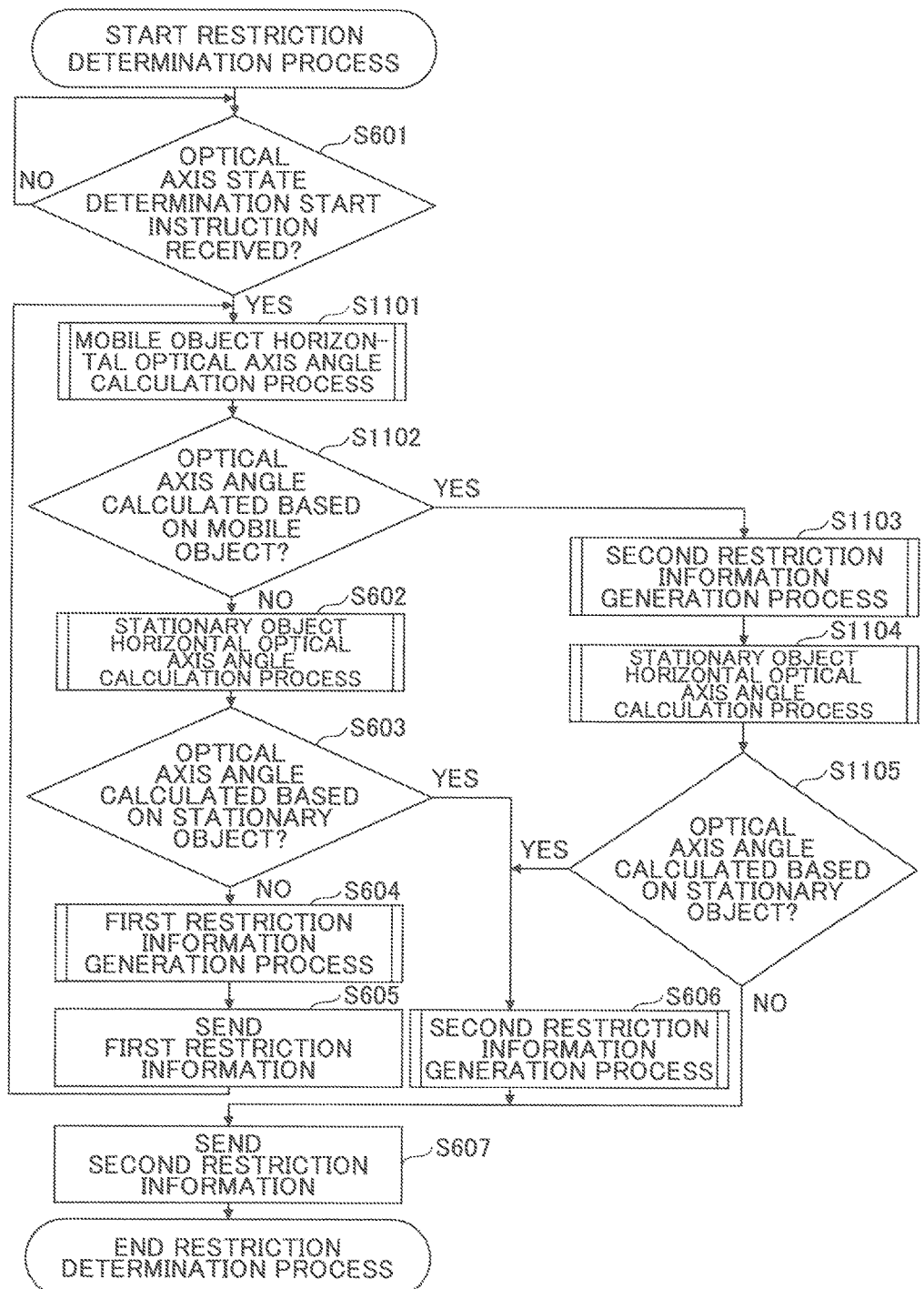
FIG. 11 is a flowchart illustrating the flow of a restriction determination process according to the second embodiment.

Next, a description is given of the flow of the restriction determination process according to the second embodiment. FIG. 11 is a flowchart illustrating the flow of the restriction determination process according to the second embodiment. Note that the differences from the restriction determination process according to the first embodiment illustrated in FIG. 6 are the processes of steps S1101 through S1105.

In step S1101, the mobile object horizontal optical axis angle calculating unit 1001 executes a mobile object horizontal optical axis angle calculation process. Note that details of the mobile object horizontal optical axis angle calculation process are described below.

In step S1102, the restriction determining unit 403 determines whether the optical axis angle in the horizontal direction has been calculated based on a mobile object. In step S1102, when the restriction determining unit 403 determines that the optical axis angle is not calculated, the process proceeds to step S602. Note that the processes of steps S602 through S606 are the same as the processes of steps S602 through S606 in the restriction determination process described above in the first embodiment.

Conversely, in step S1102, when the restriction determining unit 403 determines that the optical axis angle is calculated, the process proceeds to step S1103. In step S1103, the restriction determining unit 403 executes the second restriction information generation process. Note that details of the second restriction information generation process are described by referring to 8*b* of FIG. 8, and therefore descriptions are omitted here.

In step S1104, the stationary object horizontal optical axis angle calculating unit 402 performs a stationary object horizontal optical axis angle calculation process. Note that details of the stationary object horizontal optical axis angle calculation process are described by referring to FIG. 7, and therefore descriptions are omitted here.

In step S1105, the stationary object horizontal optical axis angle calculating unit 402 determines whether the optical axis angle in the horizontal direction has been calculated based on the stationary object. In step S1105, when the stationary object horizontal optical axis angle calculating unit 402 determines that the optical axis angle has been calculated, the process proceeds to step S606. Conversely, in step S1105, when the stationary object horizontal optical axis angle calculating unit 402 determines that the optical axis angle has not been calculated, the process proceeds to step S607.

As described above, according to the present embodiment, until the optical axis angle in the horizontal direction is calculated based on a mobile object, unless the optical axis angle in the horizontal direction is calculated based on a stationary object, the first restriction information is sent to the travel control device 140.

Then, when the optical axis angle in the horizontal direction is calculated based on a mobile object, the second restriction information, which is in accordance with the optical axis angle in the horizontal direction calculated based on a mobile object, is sent to the travel control device 140. By executing the above process, the optical axis state determination period can be reduced, because the optical axis angle is likely to be calculated more quickly in the case of a mobile object than in the case of a stationary object.

On the other hand, when the optical axis angle in the horizontal direction is calculated based on a stationary object, before the optical axis angle in the horizontal direction is calculated based on a mobile object, the second restriction information, which is in accordance with the optical axis angle in the horizontal direction calculated based on a stationary object, is sent to the travel control device 140. Furthermore, even in a case where the optical axis angle in the horizontal direction has been calculated based on a mobile object, if the optical axis angle is calculated based on a stationary object, the second restriction information, which is in accordance with the optical axis angle in the horizontal direction calculated based on a stationary object, is sent to the travel control device 140.

The precision of the optical axis angle calculated based on a stationary object is higher than the precision of the optical axis angle calculated based on a mobile object, and therefore by executing the above process, it is possible to appropriately restrict or prohibit the travel control by the travel control device 140.

<3. Description of Mobile Object Horizontal Optical Axis Angle Calculation Process>

Next, a description is given of details of the mobile object horizontal optical axis angle calculation process (step S1101) by referring to FIG. 12. 12*a* in FIG. 12 is a flowchart illustrating the flow of the mobile object horizontal optical axis angle calculation process by the mobile object horizontal optical axis angle calculating unit 1001.

In step S1201, the mobile object horizontal optical axis angle calculating unit 1001 acquires reflection data from the radar device 110. In step S1202, the mobile object horizontal optical axis angle calculating unit 1001 acquires image information from the imaging device 130.

In step S1203, the mobile object horizontal optical axis angle calculating unit 1001 determines whether it is possible to calculate the optical axis angle in the horizontal direction.

12*b* of FIG. 12 is a diagram that depicts a method of calculating the optical axis angle in the horizontal direction, based on the reflection data acquired from the radar device 110 and the image information acquired from the imaging device 130. As illustrated in 12*b* of FIG. 12, when a preceding vehicle 1211 is drawn in image information 1210, the mobile object horizontal optical axis angle calculating unit 1001 is able to recognize the presence of a mobile object (the preceding vehicle 1211) based on the image information 1210.

Furthermore, when the imaging device 130 is a stereo camera, the mobile object horizontal optical axis angle calculating unit 1001 can calculate the distance to the preceding vehicle 1211 by performing parallax calculation based on the image information 1210.

In the above status, the mobile object horizontal optical axis angle calculating unit 1001 recognizes the presence of the preceding vehicle 1211, and extracts, from the reflection data, the reception position of the reflected wave received at the timing when the distance to the preceding vehicle 1211 becomes less than or equal to a predetermined threshold.

Here, it is assumed that the mobile object horizontal optical axis angle calculating unit 1001 has calculated in advance the reception position of the reflected wave from the position of the preceding vehicle 1211, in a case where it is assumed that an optical axis deviation has not occurred. Then, the mobile object horizontal optical axis angle calculating unit 1001 calculates the optical axis angle in the horizontal direction based on the comparison between the reception position of the reflected wave in a case where it is assumed that an optical axis deviation has not occurred and the actual reception position of the radio wave.

Returning to the description of 12*a* of FIG. 12, in step S1203, when the mobile object horizontal optical axis angle calculating unit 1001 determines that it is not possible to calculate the optical axis angle in the horizontal direction, the process returns to step S1102 of FIG. 11. Specifically, when it is not possible to calculate the optical axis angle in the horizontal direction based on the comparison between the reception position of the reflected wave in a case where it is assumed that an optical axis deviation has not occurred and the actual reception position of the radio wave, the mobile object horizontal optical axis angle calculating unit 1001 determines that it is not possible to calculate the optical axis angle in the horizontal direction. For example, when it is not possible to recognize the presence of the preceding vehicle 1211, or when the preceding vehicle 1211 is recognized but the distance the preceding vehicle 1211 is greater than a predetermined threshold, the mobile object horizontal optical axis angle calculating unit 1001 determines that it is not possible to calculate the optical axis angle in the horizontal direction.

Conversely, in step S1203, when the mobile object horizontal optical axis angle calculating unit 1001 determines that it is possible to calculate the optical axis angle in the horizontal direction, the process proceeds to step S1204.

In step S1204, the mobile object horizontal optical axis angle calculating unit 1001 calculates the optical axis angle in the horizontal direction based on the comparison between the reception position of the reflected wave in a case where it is assumed that an optical axis deviation has not occurred and the actual reception position of the radio wave. In step S1205, the mobile object horizontal optical axis angle calculating unit 1001 reports the calculated optical axis angle in the horizontal direction to the restriction determining unit 403, and then the process returns to step S1102 in FIG. 11.

<4. Summary>

As is clear from the above description, in the travel control restriction-use ECU 120 according to the present embodiment, a configuration of determining whether an optical axis deviation in the horizontal direction has occurred in the radar device based on a mobile object, is added to the configuration of the first embodiment described above.

Accordingly, it becomes possible to determine the state of the optical axis of the radar device by using either a stationary object or a mobile object, and the optical axis state determination period can be reduced.

[Third Embodiment]

The first and second embodiments described above have configurations of calculating the optical axis angle in the horizontal direction in the radar device 110 based on a stationary object or a mobile object. However, in the third embodiment, a configuration of determining whether an optical axis deviation has occurred in the vertical direction based on a mobile object (an obstacle such as a preceding vehicle) is further added. In the following description of the third embodiment, the points that are different from the second embodiment are mainly described.

<1. Functional Configuration of Travel Control Restriction-use ECU>

Figure 13:
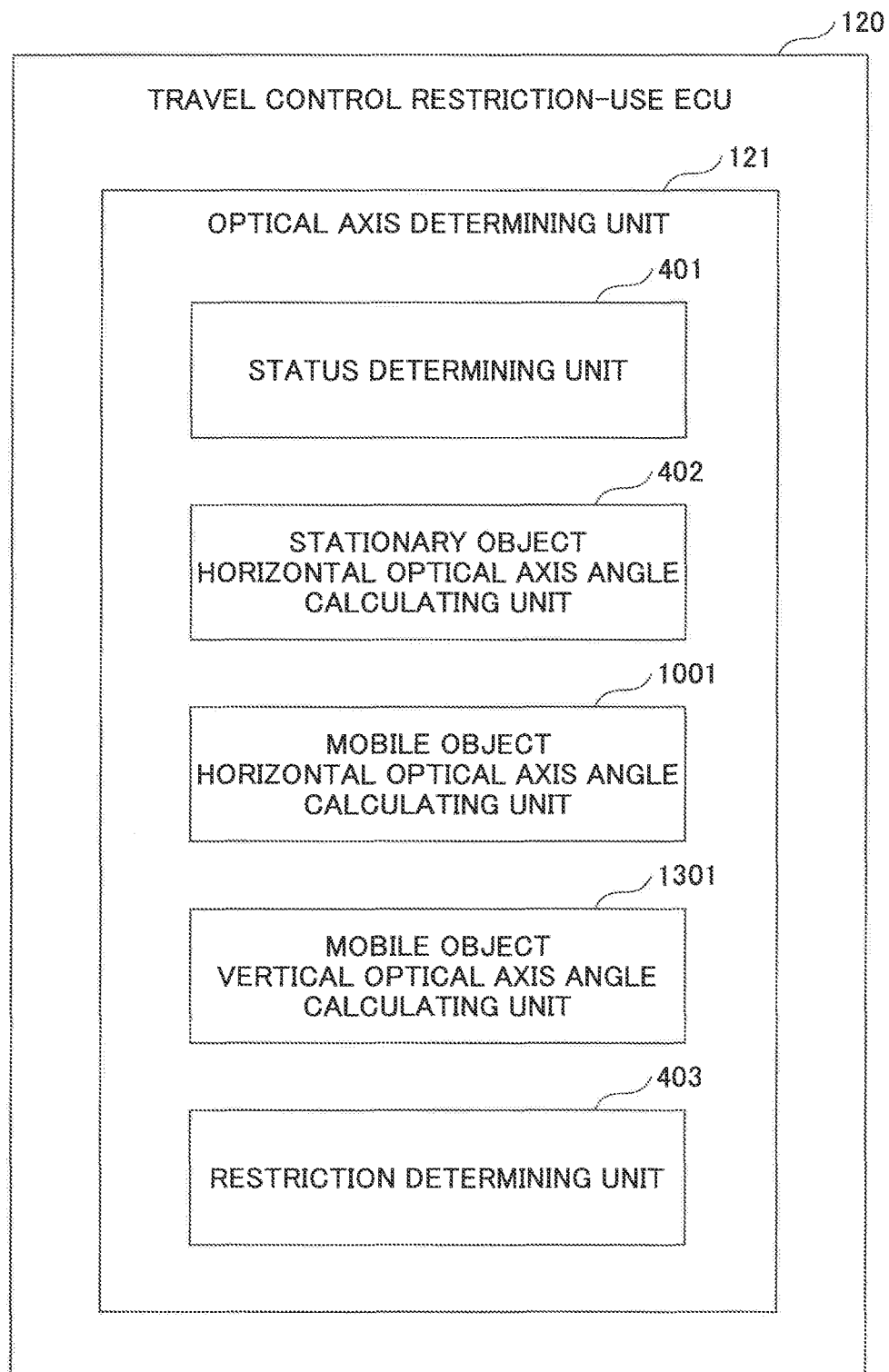
FIG. 13 is a diagram illustrating an example of the functional configuration of the travel control restriction-use ECU according to a third embodiment.

First, a description is given of the functional configuration of the travel control restriction-use ECU 120 according to the third embodiment. FIG. 13 is a diagram illustrating an example of the functional configuration of the travel control restriction-use ECU 120 according to the third embodiment. The difference from the functional configuration of the travel control restriction-use ECU 120 according to the second embodiment described by referring to FIG. 10 is that the optical axis determining unit 121 includes a mobile object vertical optical axis angle calculating unit 1301.

The mobile object vertical optical axis angle calculating unit 1301 determines whether an optical axis deviation in the vertical direction has occurred in the radar device 110, based on reflection data sent from the radar device 110 and image information sent from the imaging device 130. For example, in a case where the radar device 110 is able to recognize a preceding vehicle travelling at or within a predetermined distance based on image information from the imaging device 130, but the radar device 110 is unable to receive reflected waves from the preceding vehicle, the mobile object vertical optical axis angle calculating unit 1301 determines that an optical axis deviation in the vertical direction has occurred in the radar device 110.

<2. Flow of Restriction Determination Process>

Figure 14:
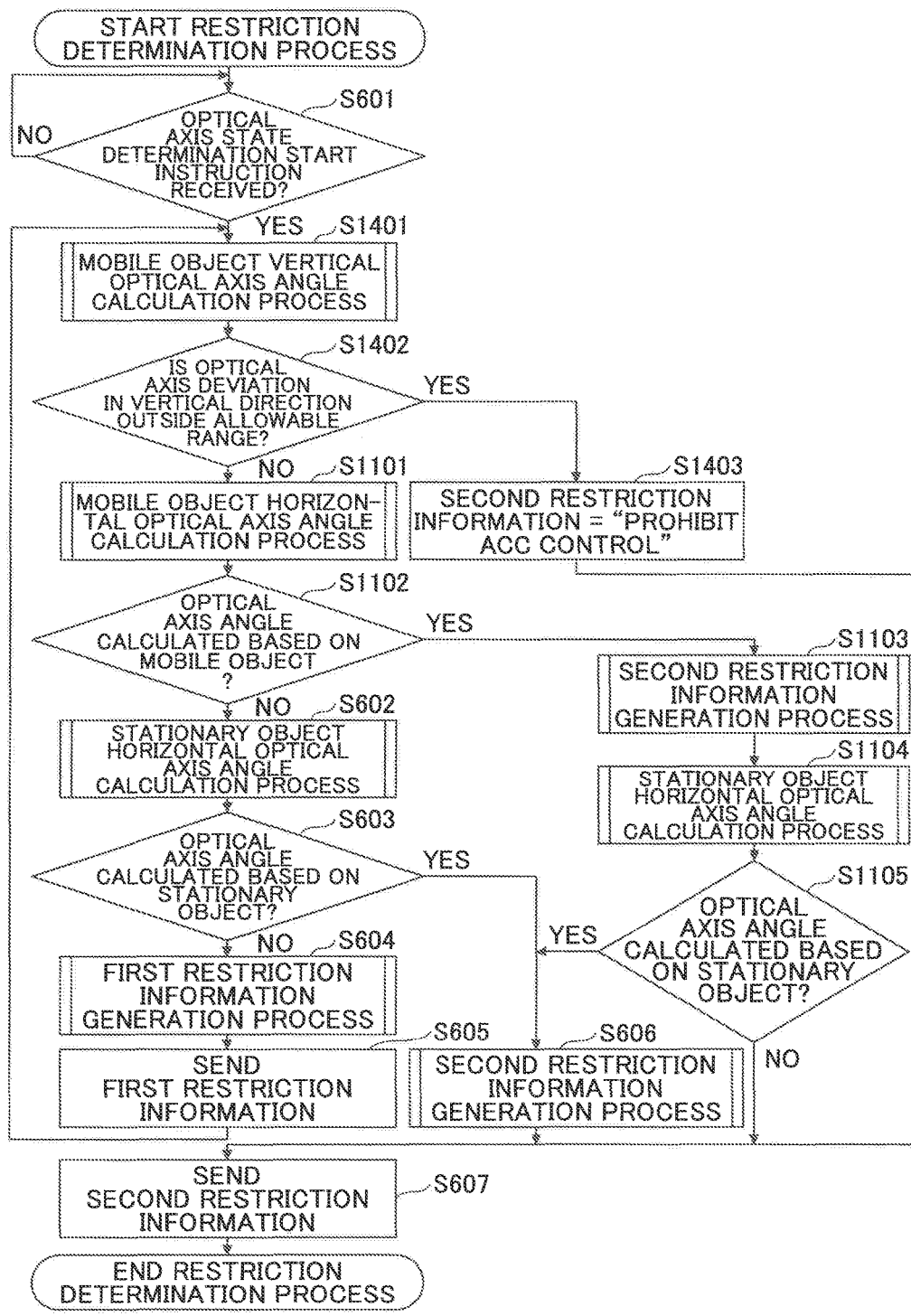
FIG. 14 is a flowchart illustrating the flow of the restriction determination process according to the third embodiment.

Next, a description is given of the flow of the restriction determination process according to the third embodiment. FIG. 14 is a flowchart illustrating the flow of the restriction determination process according to the third embodiment. Note that the differences from the restriction determination process according to the second embodiment illustrated in FIG. 11 are the processes of steps S1401 through S1403.

In step S1401, the mobile object vertical optical axis angle calculating unit 1301 executes a mobile object vertical optical axis angle calculation process. Note that details of the mobile object vertical optical axis angle calculation process are described below.

In step S1402, the restriction determining unit 403 determines whether the optical axis deviation in the vertical direction is outside an allowable range. In step S1402, when the restriction determining unit 403 determines that the optical axis deviation in the vertical direction is not outside an allowable range, the process proceeds to step S1101. Note that the processes from and beyond step S1101 are the same as the processes from and beyond step S1101 in the restriction determination process described above in the second embodiment.

Conversely, in step S1402, when the restriction determining unit 403 determines that the optical axis deviation in the vertical direction is outside an allowable range, the process proceeds to step S1403. In step S1403, the restriction determining unit 403 inputs, for example, "prohibit ACC control" in the second restriction information, and then the process proceeds to step S607.

As described above, in the present embodiment, first, the restriction determining unit 403 determines whether the optical axis deviation in the vertical direction in the radar device 110 is outside an allowable range. Then, when the optical axis deviation in the vertical direction in the radar device 110 is outside an allowable range, subsequently, the optical axis angle in the horizontal direction is not calculated, and second restriction information including prohibit ACC control is sent to the travel control device 140. Therefore, according to the present embodiment, the optical axis state determination period can be further reduced.

<3. Description of Mobile Object Vertical Optical Axis Angle Calculation Process>

Next, a description is given of details of the mobile object vertical optical axis angle calculation process (step S1401) by referring to FIG. 15. 15a of FIG. 15 is a flowchart illustrating the flow of the mobile object vertical optical axis angle calculation process by the mobile object vertical optical axis angle calculating unit 1301.

In step S1501, the mobile object vertical optical axis angle calculating unit 1301 acquires reflection data from the radar device 110. In step S1502, the mobile object vertical optical axis angle calculating unit 1301 acquires image information from the imaging device 130.

In step S1503, the imaging device 130 determines whether a reflected wave is received from a mobile object (a preceding vehicle at or within a predetermined distance) recognized based on the acquired image information.

15b in FIG. 15 is a diagram that depicts a method of determining whether a reflected wave is received from a mobile object, based on the reflection data acquired from the radar device 110 and image information acquired from the imaging device 130.

As illustrated in 15b in FIG. 15, when there is a mobile object (the preceding vehicle 1211), the mobile object vertical optical axis angle calculating unit 1301 is able to recognize the presence of the preceding vehicle 1211 based on image information. Furthermore, when the imaging device 130 is a stereo camera, the mobile object vertical optical axis angle calculating unit 1301 can calculate the distance to the preceding vehicle 1211 by performing parallax calculation based on the image information.

In the above status, the mobile object vertical optical axis angle calculating unit 1301 recognizes the presence of the preceding vehicle 1211, and determines whether reflection data is received from the preceding vehicle 1211, at the timing when the distance to the preceding vehicle 1211 becomes less than or equal to a predetermined threshold.

As illustrated in 15b in FIG. 15, when an optical axis deviation in the vertical direction has not occurred in the radar device 110 (see radiation range 1501), the radar device 110 can receive reflected waves from the preceding vehicle 1211.

Conversely, when an optical axis deviation in the vertical direction has occurred in the radar device 110 (see radiation range 1502), the radar device 110 cannot receive reflected waves from the preceding vehicle 1211.

Returning to the description of 15a of FIG. 15, in step S1503, when the imaging device 130 determines that a reflected wave is received from the preceding vehicle 1211 that has been recognized (or the preceding vehicle 1211 is recognized but the preceding vehicle 1211 is not at or within a predetermined distance, or the preceding vehicle 1211 is not recognized), the process returns to step S1402 of FIG. 14.

Conversely, in step S1503, when the imaging device 130 determines that a reflected wave is not received from the preceding vehicle 1211 that has been recognized, the process proceeds to step S1504. In step S1504, the mobile object vertical optical axis angle calculating unit 1301 reports that the optical axis deviation in the vertical direction is outside the allowable range to the restriction determining unit 403, and then the process returns to step S1402 in FIG. 14.

<4. Operations of Travel Control System>

Figure 16:
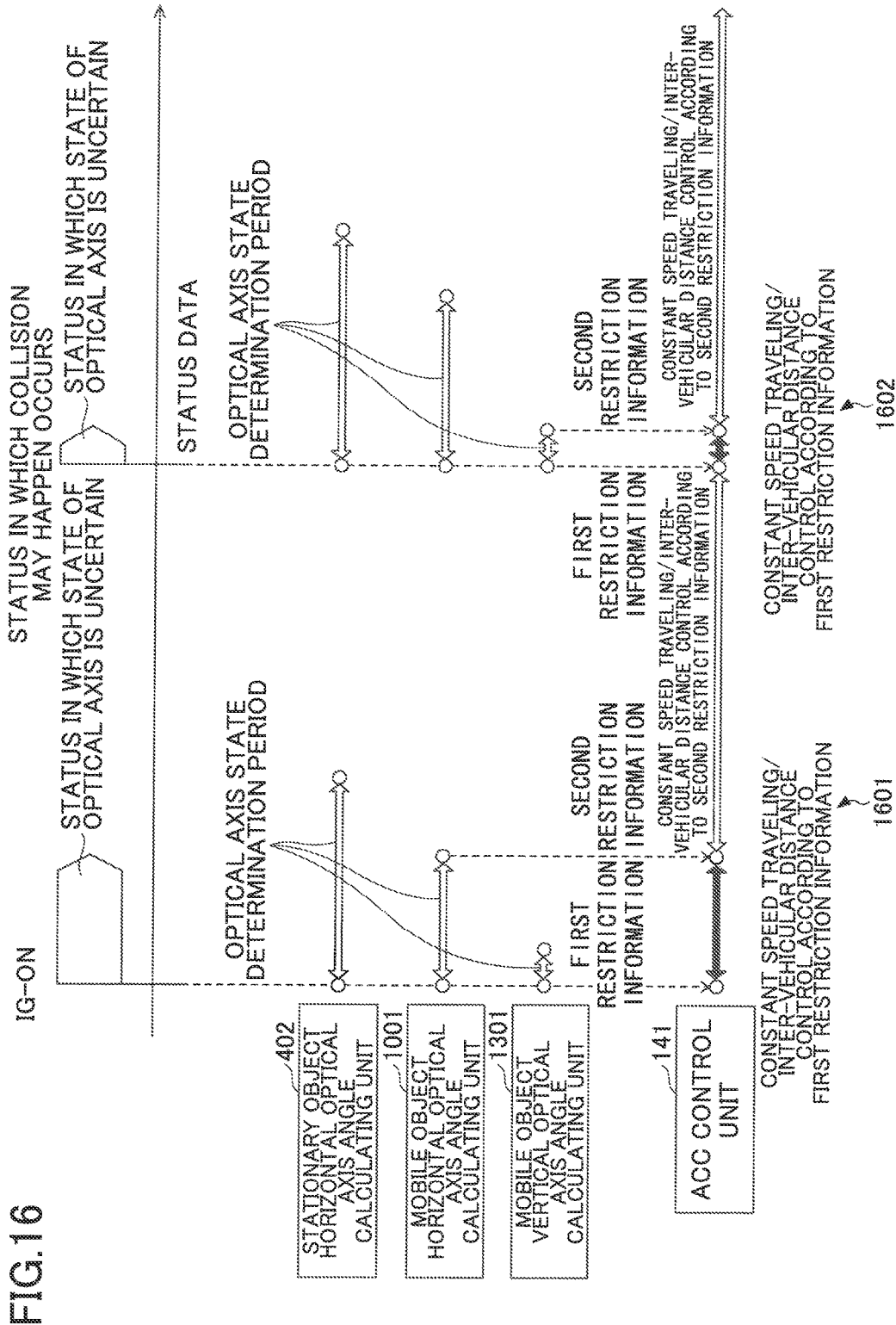
FIG. 16 is a diagram for describing operations of the travel control system.

Next, a description is given of operations of the travel control system 100 in a case where the optical axis determining unit 121 includes the stationary object horizontal optical axis angle calculating unit 402, the mobile object horizontal optical axis angle calculating unit 1001, and the mobile object vertical optical axis angle calculating unit 1301. FIG. 16 is a diagram for describing operations of the travel control system 100.

Similar to FIG. 3, when a switch ON operation is performed with respect to an ignition switch of a vehicle, and when a status in which a collision may happen occurs and status data is sent, the determination of the state of the optical axis is started.

The example of an optical axis state determination period 1601 of FIG. 16 indicates the following case, which is a result of a switch ON operation being performed with respect to the ignition switch of the vehicle and the determination of the state of the optical axis being started.

The optical axis deviation in the vertical direction is determined as being within an allowable range, and
the determination of the state of the optical axis in the horizontal direction based on a mobile object is completed earlier than the determination of the state of the optical axis in the horizontal direction based on a stationary object.

In this case, the mobile object horizontal optical axis angle calculating unit 1001 calculates the optical axis angle in the horizontal direction, and the restriction determining unit 403 generates second restriction information according to the calculated optical axis angle, and then sends the second restriction information to the ACC control unit 141, and the restriction determination process ends. As a result, it is possible to reduce the optical axis state determination period even more than the case where the restriction determination process is performed based on the optical axis angle in the horizontal direction calculated by the stationary object horizontal optical axis angle calculating unit 402.

Furthermore, the example of an optical axis state determination period 1602 of FIG. 16 indicates a case in which, as a result of the status data being sent and the determination of the state of the optical axis being started, the optical axis deviation in the vertical direction is determined to be outside an allowable range.

In this case, the restriction determining unit 403 sends, for example, second restriction information indicating "prohibit ACC control" to the ACC control unit 141. As a result, it is possible to reduce the optical axis state determination period even more than the case where the restriction determination process is performed based on the optical axis angle in the horizontal direction calculated by both the stationary object horizontal optical axis angle calculating unit 402 and the mobile object horizontal optical axis angle calculating unit 1001.

<5. Summary>

As is clear from the above description, in the travel control restriction-use ECU 120 according to the present embodiment, a configuration of determining whether an optical axis deviation in the vertical direction has occurred, is added to the configuration of the second embodiment described above. Furthermore, the restriction determination process is ended without calculating the optical axis angle in the horizontal direction, when it is determined that the optical axis deviation in the vertical direction that has occurred in the radar device, is outside an allowable range. Accordingly, the optical axis state determination period can be further reduced.

[Other Embodiments]

In the first through third embodiments described above, as examples of cases where a status, in which a collision with an obstacle may happen, has occurred, after PCS actuation or when an obstacle is determined to be approaching at or within a predetermined distance are given. However, the cases where a status, in which a collision with an obstacle may happen, has occurred, are not limited to these examples. For example, a case where the distance to an obstacle in the horizontal direction has become less than or equal to a predetermined threshold, or the time until the collision that is estimated based on the approaching speed, etc., may be given.

Note that the determination of whether a status, in which a collision with an obstacle may happen, has occurred, is made based on a predetermined condition, such as the reliability of recognizing the obstacle is greater than or equal to a predetermined threshold, or the probability that the obstacle is travelling along the same lane as the vehicle 701 is greater than or equal to a predetermined threshold.

Furthermore, in the third embodiment described above, in order to calculate the optical axis angle of the radar device 110, the optical axis determining unit 121 is provided with the stationary object horizontal optical axis angle calculating unit 402, the mobile object horizontal optical axis angle calculating unit 1001, and the mobile object vertical optical axis angle calculating unit 1301. However, the optical axis determining unit 121 does not have to be provided with all of the calculating units of the stationary object horizontal optical axis angle calculating unit 402, the mobile object horizontal optical axis angle calculating unit 1001, and the mobile object vertical optical axis angle calculating unit 1301; the optical axis determining unit 121 may be provided with only one or two of these calculating units. Alternatively, a calculating unit other than these calculating units may be provided to calculate the optical axis angle. Note that the combination of the plurality of calculating units may be any combination; for example, the combination is not limited to the combination indicated in the second embodiment described above.

Note that the present invention is not limited to the configurations described herein; other elements may be combined with the configurations, etc., of the above embodiments. These configurations may be modified without departing from the scope of the present invention, and may be appropriately defined according to the application forms.

The present international patent application claims the benefit of priority of Japanese Priority Patent Application No. 2015-097413, filed on May 12, 2015, the contents of which are incorporated herein by reference in their entirety.

REFERENCE SIGNS LIST

100: travel control system
110: radar device
111: activation switch detecting device
120: travel control restriction-use ECU
121: optical axis determining unit
130: imaging device
140: travel control device
141: ACC control unit
142: PCS control unit
150: power train control device
160: brake control device
401: status determining unit
402: stationary object horizontal optical axis angle calculating unit
403: restriction determining unit
1001: mobile object horizontal optical axis angle calculating unit
1301: mobile object vertical optical axis angle calculating unit

The invention claimed is:

1. A travel control device of a vehicle for restricting or prohibiting execution of travel control of the vehicle based on a detection result obtained by a radar device, the travel control device comprising:
 a determining unit configured to determine whether an axis deviation has occurred in the radar device based on the detection result obtained by the radar device, when a detection device, which is configured to detect a switch on operation and a switch off operation with respect to an activation switch of the vehicle, detects the switch on operation with respect to the activation switch of the vehicle; and
 a restricting unit configured to restrict or prohibit execution of the travel control, during a period from when the switch on operation is performed with respect to the activation switch of the vehicle to when the determination of whether the axis deviation has occurred is completed.

2. The travel control device according to claim 1, wherein the restricting unit restricts a range of detection by the radar device, in the travel control of the vehicle.

3. The travel control device according to claim 1, wherein the restricting unit restricts or prohibits execution of the travel control when the determining unit determines that the axis deviation has occurred in the radar device in either a horizontal direction or a vertical direction.

4. The travel control device according to claim 1, wherein the restricting unit restricts or prohibits execution of the travel control, when the determining unit determines that the axis deviation has occurred in the radar device based on the detection result obtained by the radar device, the detection result being obtained based on either a stationary object or a mobile object.

5. The travel control device according to claim 1, wherein the determining unit is configured to determine whether the axis deviation has occurred in the radar device based on reflection data of a wave reflected from an object and included in the detection result obtained by the radar device, when the detection device detects the switch on operation with respect to the activation switch of the vehicle.

* * * * *